United States Patent [19]

Tanaka

[11] Patent Number: 4,974,949
[45] Date of Patent: Dec. 4, 1990

[54] ZOOM LENS BARREL

[75] Inventor: Hitoshi Tanaka, Tokyo, Japan

[73] Assignee: Asahi Kogaku Kogyo Kabushiki Kaisha, Tokyo, Japan

[21] Appl. No.: 285,030

[22] Filed: Dec. 16, 1988

[30] Foreign Application Priority Data

Dec. 21, 1987 [JP] Japan ................... 62-323246
Dec. 21, 1987 [JP] Japan ................... 62-323247
Dec. 21, 1987 [JP] Japan ................... 62-323248
Sep. 26, 1988 [JP] Japan ................... 63-242099

[51] Int. Cl.$^5$ ............................................. G02B 15/00
[52] U.S. Cl. ..................... 350/429; 350/430; 354/195.12
[58] Field of Search .......... 350/429, 430, 255; 354/400, 195.12

[56] References Cited

U.S. PATENT DOCUMENTS

| 4,074,931 | 2/1978 | Okudaira . | |
|---|---|---|---|
| 4,275,952 | 6/1981 | Uesugi | 350/429 |
| 4,445,756 | 5/1984 | Komoto | 350/429 |
| 4,472,031 | 9/1984 | Muryoi | 350/429 |
| 4,726,667 | 2/1988 | Tachihara | 350/426 |

FOREIGN PATENT DOCUMENTS 61-259237 11/1986 Japan .
62-109012 5/1987 Japan .
62-200340 9/1987 Japan .
62-209425 9/1987 Japan .

Primary Examiner—Bruce Y. Arnold
Assistant Examiner—Loha Ben
Attorney, Agent, or Firm—Sandler, Greenblum & Bernstein

[57] ABSTRACT

A zoom lens barrel wherein first and second lens groups are moved through different distances along an optical axis in interlocking relation to each other to effect zooming. A device for supporting the second lens group is supported by a device for supporting the first lens group in such a manner that the second lens group supporting device is movable along the optical axis relative to the first lens group supporting device. When a drive ring for driving the first lens group supporting device is activated, the first lens group supporting device is moved forward or rearward along the optical axis in response to the rotation of the drive ring and, at the same time, a drive cam device for driving the second lens group supporting device to move along the optical axis relative to the first lens group supporting device is caused to rotate around the optical axis by the drive ring.

27 Claims, 24 Drawing Sheets

ZOOM LENS BARREL

BACKGROUND OF THE INVENTION

1. Field of the Invention

The present invention relates to a zoom lens barrel for use in optical instruments such as cameras. More particularly, the present invention pertains to an improvement in the mechanism for effecting zooming by moving a plurality of lens groups in interlocking relation to each other.

Recently, zoom lens barrels for use in cameras or other similar optical instruments have been required to have both a high zoom ratio and a reduced size, which are requirements contradictory to each other. As a result, the sensitivity of the optical system becomes so high that a slight error in the distance between a pair of lens groups causes a large deviation from the in-focus position. Accordingly, recent zoom lens barrels need to control the position of each lens group with a much higher degree of accuracy than before.

2. Description of the Prior Art

FIG. 45 shows an example of one type of zoom lens barrel in which a plurality of lens groups are moved through different distances along an optical axis in interlocking relation to each other to effect zooming.

More specifically, a first support frame 552 for supporting a first lens group 551 and a second support frame 554 for supporting a second lens group 553 are disposed in such a manner that the first and second support frames 552 and 554 are movable only in the direction of the optical axis. The support frames 552 and 554 are provided with respective guide pins 557 and 558 which are engaged with two cam grooves 560 and 561, respectively, formed in one drive ring 559. In response to the rotation of the drive ring 559, both the first and second lens groups 551 and 553 move through different distances along the optical axis in interlocking relation to each other.

The above-described zoom lens barrel suffers, however, from the following disadvantages. Namely, clearances which are present in between the two cam grooves 560, 561 and the corresponding guide pins 557, 558 directly affect the distance between the two lens groups 551 and 553. Accordingly, every time the zooming operation is conducted, the distance between the lens groups 551 and 553 varies, causing the focal plane to be offset.

Further, since the cam grooves 560 and 561 for driving the lens groups 551 and 553 are formed in a single drive ring 559, the overall length of the drive ring 559 is determined by the range of travel of the lens groups. Accordingly, it is extremely difficult to achieve a reduction in the size of the zoom lens barrel which needs to increase the range of travel of the lens groups in order to meet the demand for a higher zoom ratio.

If macrophotography is added to a zoom lens barrel having a structure such as that shown in FIG. 45, it is necessary to enable the first lens group 551 to be extended further forward from the longest focal length position where the lens group is extended most. In other words, addition of the macrophotography function causes the the lens barrel to be lengthened, resulting in an increase in the overall size.

SUMMARY OF THE INVENTION

An object of the present invention is to provide a zoom lens barrel which is designed so that it is possible to move a plurality of lens groups in interlocking relation to each other while accurately controlling the distance between the lens groups in a zooming operation while reducing the overall size of the lens barrel so as to realize a compact zoom lens barrel.

Another object of the present invention is to provide a zoom lens barrel which is designed so that it is possible to obtain a high degree of focusing accuracy in zooming while also incorporating a macrophotography function into a compact lens barrel.

Other objects and advantages of the present invention will become apparent from the following detailed description of illustrated embodiments of the invention.

According to the present invention, a zoom lens barrel is provided having first and second lens groups which are moved through different distances along an optical axis in interlocking relation to each other to effect zooming. The zoom lens barrel comprises a first lens group supporting device for supporting a first lens group, the first lens group supporting device being movable along an optical axis; a second lens group supporting device for supporting the second lens group, the second lens group supporting device being supported by the first lens group supporting device in such a manner that the second lens group supporting device is movable along the optical axis relative to the first lens group supporting device; a drive ring provided in such a manner as to be rotatable around the optical axis to cause the first lens group supporting device to move back and forth along the optical axis; and a drive cam device fitted to the first lens group supporting device in such a manner as to be rotatable around the optical axis, the drive cam device being rotated by the drive ring so as to cause the second lens group supporting device to move back and forth along the optical axis relative to the first lens group supporting device.

BRIEF DESCRIPTION OF THE DRAWINGS

The present invention may be more fully understood from the description of preferred embodiments of the invention set forth below, together with the accompanying drawings, in which:

FIGS. 1 to 20 show in combination a first embodiment of the zoom lens barrel according to the present invention, of which:

FIG. 1 is a fragmentary sectional side view taken along line I—I of FIG. 3, showing an upper-half portion of a zoom lens barrel;

FIG. 2 is a fragmentary sectional side view of the zoom lens barrel taken along line II—II of FIG. 3, which shows another section thereof;

FIG. 3 is a sectional front view of the zoom lens barrel;

FIG. 4 is an exploded perspective view of the zoom lens barrel;

FIGS. 5 and 6 are development views showing the positional relationship between a plurality of the cam grooves and guide pins which are provided in the zoom lens barrel;

FIGS. 7 and 8 are development views showing the positional relationship between the cam grooves and the guide pins in a state wherein the lens groups are extended halfway;

FIG. 9 is a fragmentary sectional side view of the zoom lens barrel in a state wherein the lens groups are extended halfway;

FIG. 10 is a fragmentary sectional side view of the zoom lens barrel in a state wherein the lens groups are fully extended;

FIGS. 11 and 12 are development views showing the positional relationship between the cam grooves and the guide pins when the zoom lens barrel is in the state shown in FIG. 10;

FIGS. 13 and 14 are development views showing the positional relationship between the cam grooves and the guide pins when the lens system is in a macrophotography state;

FIGS. 15 and 16 are development views showing the positional relationship between the cam grooves and the guide pins when the lens system is in a housed state;

FIG. 17 is a fragmentary sectional side view of the zoom lens barrel in a state wherein the lens system is housed in the lens barrel;

FIGS. 18 and 19 are graphs showing the relationship between the amount (X) of movement of the lens groups verses angle ($\theta$) of rotation of the drive ring and the focal length (F); and FIG. 20 is a graph showing the relationship between the locus of a cam groove and the amount (R) of rotation of a drive cam cylinder.

FIGS. 21 to 33 show in combination a second embodiment of the zoom lens barrel according to the present invention, of which:

FIG. 21 is a fragmentary sectional side view taken along line XXI—XXI of FIG. 23 showing an upper-half portion of a zoom lens barrel;

FIG. 22 is a fragmentary sectional side view taken along line XXII—XXII of FIG. 23 of the zoom lens barrel;

FIG. 23 is a sectional front view of the zoom lens barrel of the second embodiment;

FIGS. 24 to 26 are development views showing the positional relationship between a plurality of cam grooves and guide pins which are provided in the zoom lens barrel;

FIG. 27 is a fragmentary sectional side view of the zoom lens barrel in a state wherein the lens groups are extended halfway;

FIGS. 28 to 32 are development views showing the positional relationship between the cam grooves and the guide pins; and FIG. 33 is a fragmentary sectional side view of the zoom lens barrel when the lens system is in a housed state.

FIGS. 34 to 37 show in combination a third embodiment of the zoom lens barrel according to the present invention, of which:

FIG. 34 is a fragmentary sectional side view showing an upper-half portion of the zoom lens barrel;

FIG. 35 is a fragmentary sectional side view showing the upper-half portion of the zoom lens barrel in another state;

FIG. 36 is a development view showing the positional relationship between a plurality of cam grooves and guide pins when the zoom lens barrel is in the state shown in FIG. 34; and FIG. 37 is a development view showing the positional relationship between the cam grooves and the guide pins when the zoom lens barrel is in the state shown in FIG. 35.

FIGS. 38 to 44 show in combination a fourth embodiment of a zoom lens barrel according to the present invention, of which:

FIGS. 38 to 40 are development views showing the positional relationship between a plurality of cam grooves and guide pins which are provided in the zoom lens barrel;

FIG. 41 is a fragmentary sectional side view of the zoom lens barrel in a state wherein lens groups are extended halfway; and FIGS. 42 to 44 are development views showing the positional relationship between the cam grooves and the guide pins.

DESCRIPTION OF THE EMBODIMENTS

Figure 1:
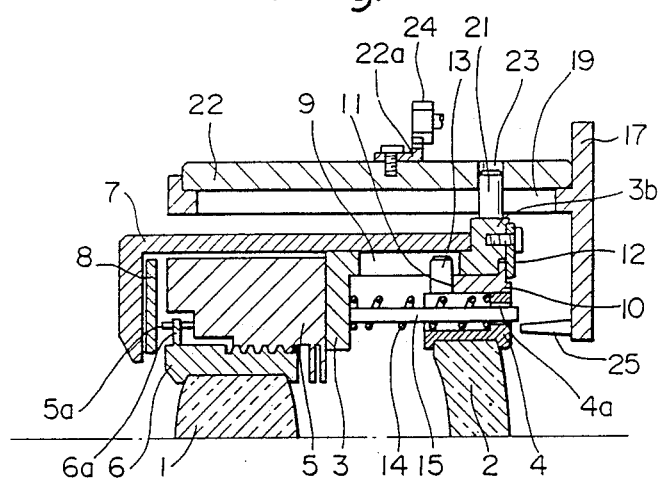
Figure 2:
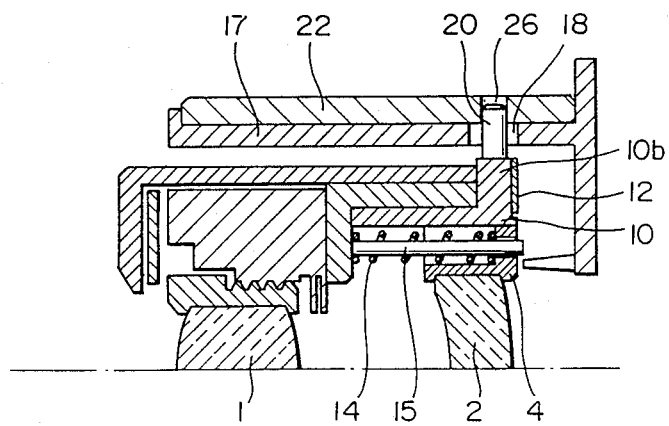
Figure 3:
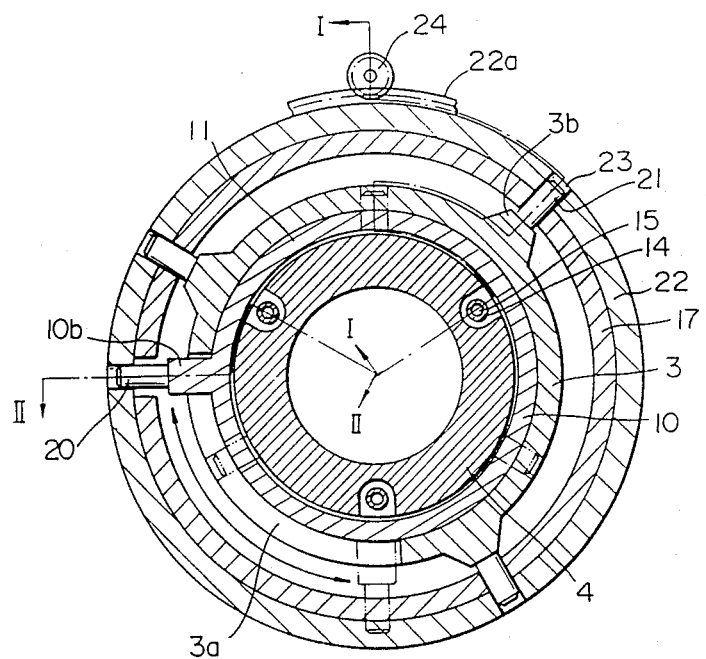
Figure 4:
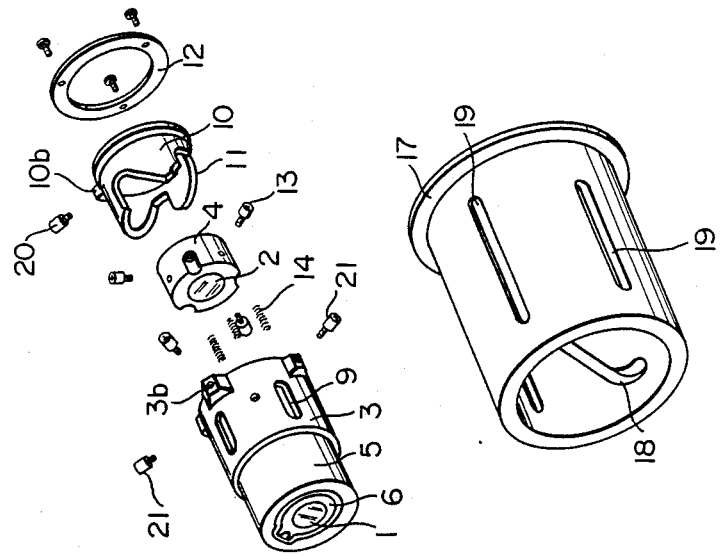
Figure 4:
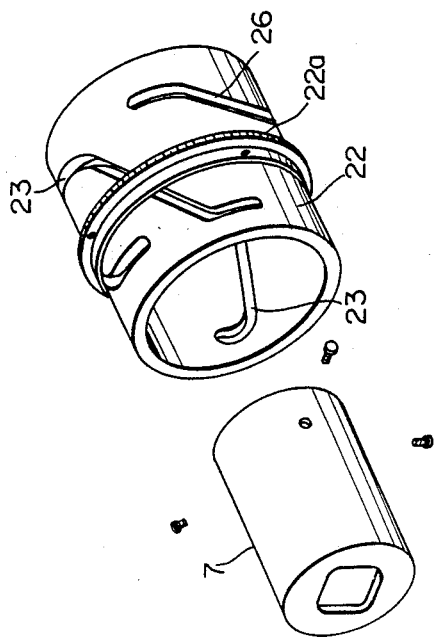

FIGS. 1 and 2 show a first embodiment of a zoom lens barrel according to the present invention which is in the shortest focal length position as a result of zooming. FIG. 3 is a sectional front view showing the positional relationship between a plurality of cam grooves and guide pins of the zoom lens barrel.

In the figures, reference numeral 1 denotes a first lens group which has a relatively small amount of movement, while numeral 2 denotes a second lens group having a relatively large amount of movement. Although the illustrated lens groups 1 and 2 are each comprised of a single lens, it should be noted that each lens group may comprise a plurality of lenses.

Reference numeral 3 denotes a first lens group supporting frame for supporting the first lens group 1. Numeral 4 denotes a second lens group supporting frame for supporting the second lens group 2. An auto focus unit 5 is rigidly secured to the first lens group supporting frame 3. The first lens group 1 is rigidly secured to the inner periphery of a helicoidal ring 6 which is in threaded engagement with the auto-focus unit 5. The first lens group 1 is driven in the direction of an optical axis for purposes of focusing by the operation of the auto-focus unit 5. More specifically, the auto-focus unit 5 activates an actuating pin 5a to rotate a predetermined amount around the optical axis in accordance with the camera-to-subject distance, thus causing an engagement piece 6a, engaged with the pin 5a, to rotate so as to extend the first lens group 1. Although in this embodiment the first lens group 1 is supported by the first lens group supporting frame 3 through both the autofocus unit 5 and the helicoidal ring 6, the first lens group 1 may be supported directly by the supporting frame 3.

Reference numeral 7 denotes a cover which is rigidly secured to the first lens group supporting frame 3 by means of screws, while numeral 8 denotes a barrier which is arranged to move to the front side of the first lens group 1 so as to protect the lens surface when the camera is not used.

Within the rear half of the first lens group supporting frame 3 are three rods 15 rigidly disposed parallel with the optical axis. The second lens group supporting frame 4 is engaged with the rods 15 through engagement bores 4a and are thereby supported in such a manner that it is slidable in the direction of the optical axis. More specifically, the second lens group supporting frame 4 is supported by the first lens group supporting frame 3 such that the former is movable relative to the latter along the optical axis.

Figure 6:
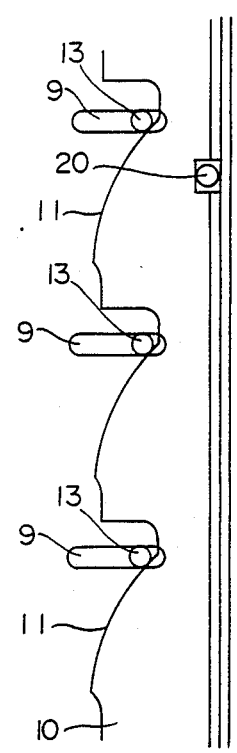

Inside the first lens group supporting frame 3 is a drive cam cylinder 10 fitted in such a manner as to be rotatable around the optical axis so as to cause the second lens group supporting frame 4 to move relative to the first lens group supporting frame 3 in the direction of the optical axis. In this embodiment, the first lens group supporting frame 3 is cut so that the drive cam cylinder 10 can rotate 90 degrees. Reference numeral 3a, shown in FIG. 3, denotes the cut portion formed in the first lens group supporting frame 3. Reference numeral 11 denotes a cam surface of the drive cam cylinder 10. FIG. 6 shows the development of the cam surface 11 of the drive cam cylinder 10.

The second lens group supporting frame 4 has guide pins 13 projecting from the outer surface thereof. Coil springs, which serve as biasing means 14, are compressingly disposed between the first and second lens group supporting frames 3 and 4, in such a manner that the coil springs surround the rods 15. Thus, the coil springs 14 constantly press the guide pins 13 against the drive cam surface 11. The distal end portions of the guide pins 13 engage straight grooves 9 which are provided in the first lens group supporting frame 3 such that the grooves 9 are parallel with the optical axis. A total of three sets of straight grooves 9 and guide pins 13 are provided around the circumference of the first lens group supporting frame 3. Reference numeral 12 denotes a stopper plate which is rigidly secured to the rear end of the first lens group supporting frame 3 to prevent the drive cam cylinder 10 from moving in the axial direction.

It should be noted that rotatable guide rollers or the like may also be employed as the guide pins 15.

Figure 5:
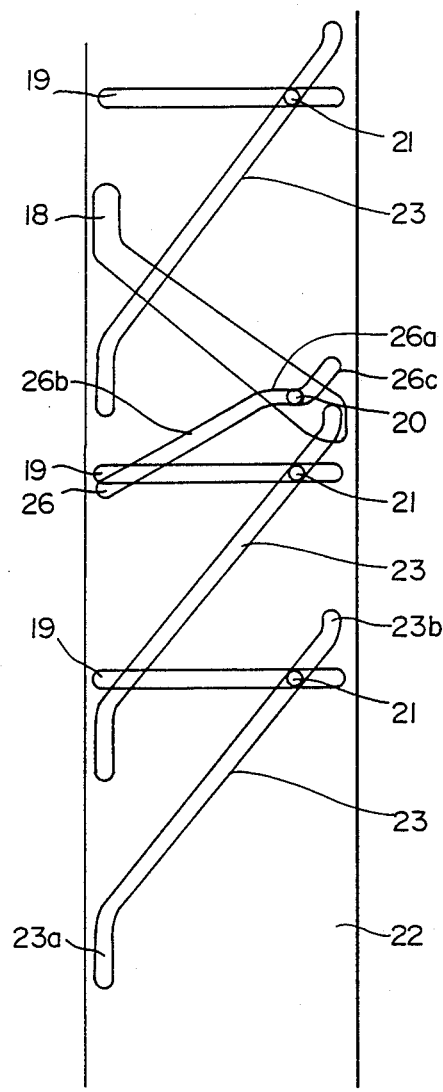

Three projections 3b are formed on the outer surface of the rear end portion of the first lens group supporting frame 3, and guide pins 21 are provided on the projections 3b, respectively. A mounting frame 17, which is secured to a camera body is provided with three straight grooves 19 extending parallel with the optical axis. A drive ring 22, fitted on the outer periphery of the mounting frame 17 such that the drive ring 22 is rotatable around the optical axis, has three first cam grooves 23. The guide pins 21, which are provided on the first lens group supporting frame 3, are respectively engaged with both the straight grooves 19 in the mounting frame 17 and the first cam grooves 23 in the drive ring 22. Referring to FIG. 5, which is a development view showing the first cam grooves 23, as the drive ring 22 rotates, the guide pins 21 are guided by the first cam grooves 23 so as to move along the optical axis, thus causing the first lens group 1 to move back and forth along the optical axis. It should be noted that both ends of each first cam groove 23 has at it's circumferential groove portions 23a and 23b which prevent the guide pins 21 from moving along the optical axis.

A projection 10b is formed on the rear end portion of the drive cam cylinder 10, and a guide pin 20 is provided on the projection 10b. The distal end portion of the guide pin 20 is engaged with a second cam groove 26 which is formed in the drive ring 22. The mounting frame 17 has a relief groove 18 provided in the portion along which the guide pin 20 moves. Development views of the second cam groove 26 and the relief groove 18 are shown in FIG. 5. As will be clear from FIG. 5, the second cam groove 26 comprises a straight groove portion 26a with which the guide pin 20 is engaged when the zoom lens barrel is in the illustrated state, a forward portion 26b having a smaller angle of slope than that of the first cam grooves 23, and a rear portion 26c extending parallel with the first cam grooves 23. Thus, the guide pin 20, which moves back and forth along the optical axis together with the first lens group supporting frame 3, is guided by the second cam groove 26 so as to rotate around the optical axis, thereby causing the drive cam cylinder 10 to rotate around the optical axis. As a result, the second lens group supporting frame 4 moves relative to the first lens group supporting frame 3 along the optical axis through the guide pin 13, which are guided by the drive cam surface 11 shown in FIG. 6.

Figure 20:
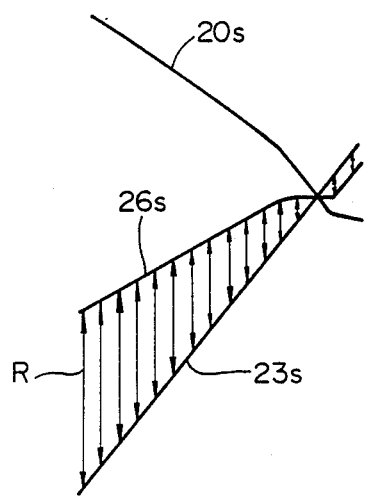

FIG. 20 shows the relationship between the loci of the first and second cam grooves 23, 26 and the amount of rotation of the drive cam cylinder 10 (i.e., the amount of rotation of the guide pin 20) as noted as R. As will be understood from the figure, the drive cam cylinder 10 rotates by the difference between the central locus 23s of the first cam groove and the central locus 26s of the second cam groove. The locus of movement of the guide pin 20 which rotates in this way is represented by the curve 20s.

A toothed member 22a is rigidly secured to the outer periphery of the drive ring 22 by means of screws, and a pinion 24 is meshed with the toothed member 22a, the pinion 24 being rotated by means of a driving motor (not shown). The arrangement may also be such that the drive ring 22 is rotated by a manual operation through a manual operation ring or the like. Reference numeral 25 denotes a stopper which abuts against the rear end face of the second lens group supporting frame 4 to limit the rearward movement of the second lens group supporting frame 4, the stopper 25 projecting from the mounting frame 17.

The following is a description of the operation of the above-described embodiment.

When the zoom lens barrel is in the shortest focal length position, shown in FIGS. 1 and 2, the guide pins 13, 20 and 21 are in the respective positions shown in FIGS. 5 and 6, as described above.

Figure 7:
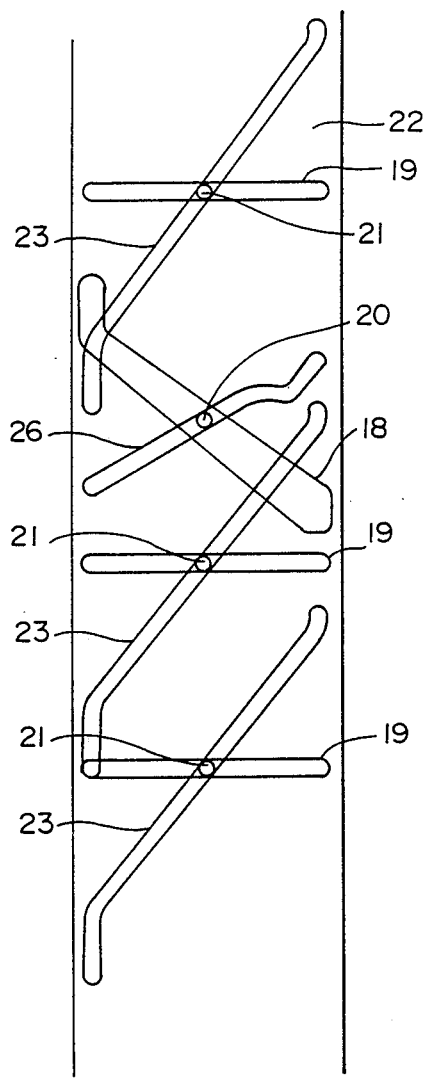

When, in this state, the pinion 24 is rotated by the driving motor (not shown), the drive ring 22 rotates around the optical axis. As a result, the guide pins 21 which are provided on the first lens group supporting frame 3 are guided so as to move forward by the first cam grooves 23 formed in the drive ring 22. FIG. 7 is a development view showing the guide pins 21 which are in said state. As a result, the first lens group supporting frame 3 moves forward together with the first lens group 1.

Figure 8:
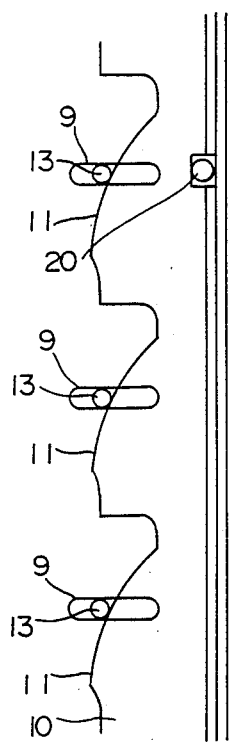
Figure 9:
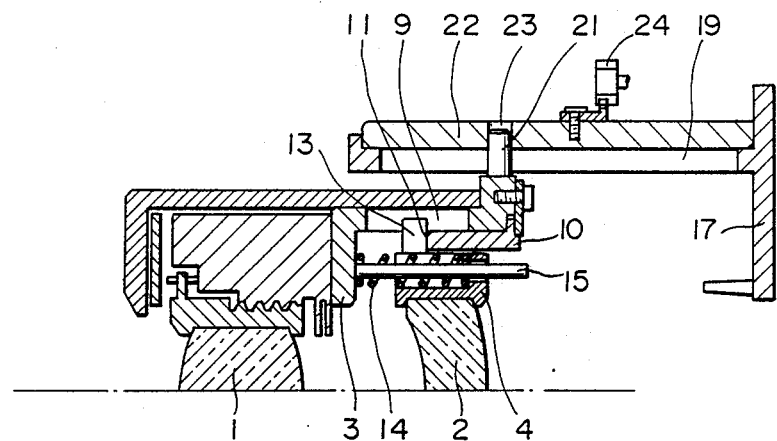

As the first lens group supporting frame 3 moves forward, the guide pin 20, which is provided on the drive cam cylinder 10, moves forward together with the first lens group supporting frame 3, so that the guide pin 20, which is guided by the second cam groove 26, rotates around the optical axis. As a result, the drive cam cylinder 10 rotates around the optical axis and the guide pins 13, which are provided on the second lens group supporting frame 4, move forward against the biasing force from the coil springs 14, as shown in FIG. 8. As a result, the second lens group supporting frame 4 moves forward and the second lens group 2 comes closer to the first lens group 1, as shown in FIG. 9.

More specifically, the distance between the first and second lens groups 1 and 2 is determined by the configuration of the cam surface 11 formed on the drive cam cylinder 10, which is actuated in response to the axial movement of the first lens group supporting frame 3. In this way, the second lens group 2 moves forward by a distance which corresponds to the sum of the amount of movement of the first lens group supporting frame 3 and the amount of movement of the second lens group supporting frame 4, relative to the first lens group supporting frame 3.

Figure 10:
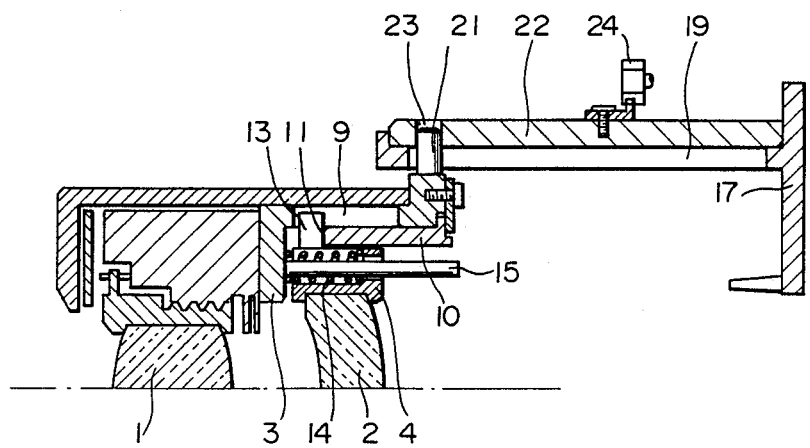
Figure 11:
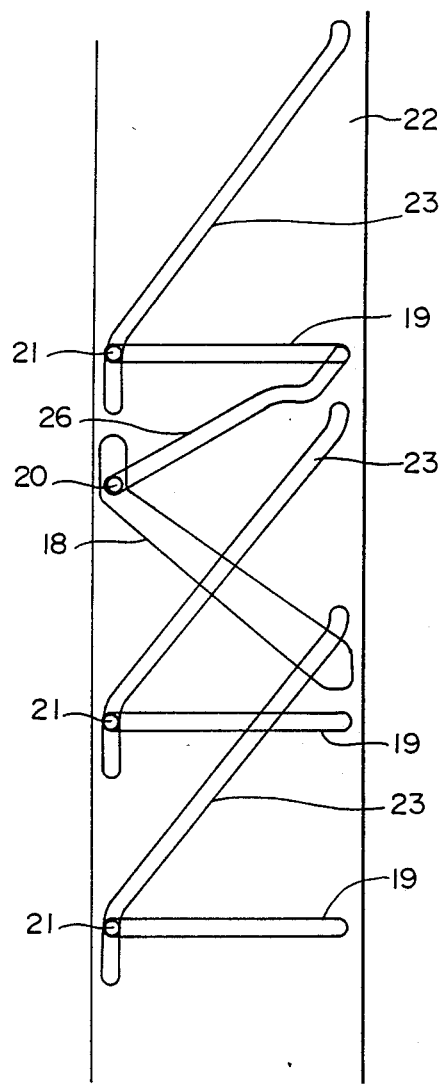
Figure 12:
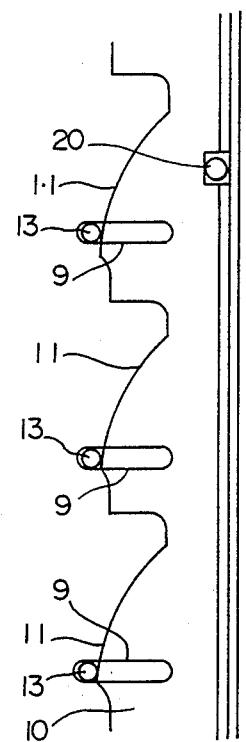

As the drive ring 22 is further rotated, the guide pins 13, 20 and 21 move as shown in FIGS. 11 and 12. More specifically, the guide pins 21 which are provided on the first lens group supporting frame 3 move to the forward extremity of their travel. On the other hand, the guide pin 20 which is provided on the drive cam cylinder 10 rotates through a relatively large angle (e.g., approximately 70 degrees), so that the guide pins 13 which are provided on the second lens group supporting frame 4 reach the highest position on the drive cam surface 11. As a result, the first and second lens groups 1 and 2 are closest to each other, that is, the distance therebetween is the shortest, as shown in FIG. 10. When the zoom lens barrel is in the position shown in FIG. 10, the focal length is the longest. If the rotation of the pinion 24 is suspended prior to reaching the position illustrated in FIG. 10, the lens groups 1 and 2 are stopped halfway and thus an intermediate focal length is obtained. If the pinion 24 is reversed, the zoom lens barrel returns to the shortest focal length position shown in FIG. 1.

Figure 13:
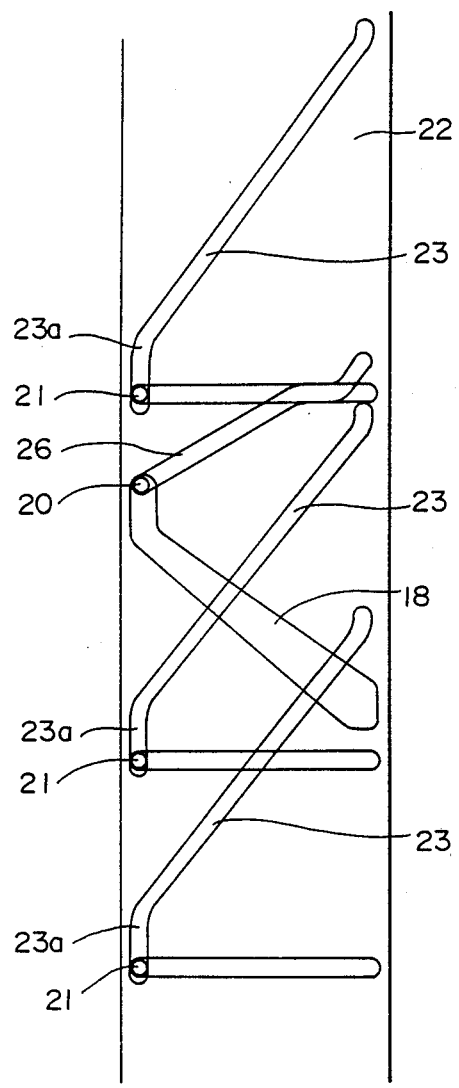

The zoom lens barrel according to the present invention also permits macrophotography. To accomplish macrophotography, a switch (not shown) for macrophotography is activated to activate the driving motor (not shown) so as to rotate the pinion 24 from the short focal length side toward the long focal length side beyond the longest focal length position shown in FIG. 10. As a result, the drive ring 22 further rotates around the optical axis and the guide pins 21, which are integral with the first lens group supporting frame 3, are engaged with the respective circumferential groove portions 23a of the first cam grooves 23, as shown in FIG. 13. Accordingly, the guide pins 21 do not move in the direction of the optical axis, but the guide pin 20 which is provided on the drive cam cylinder 10 rotates around the optical axis through the second cam groove 26.

Figure 14:
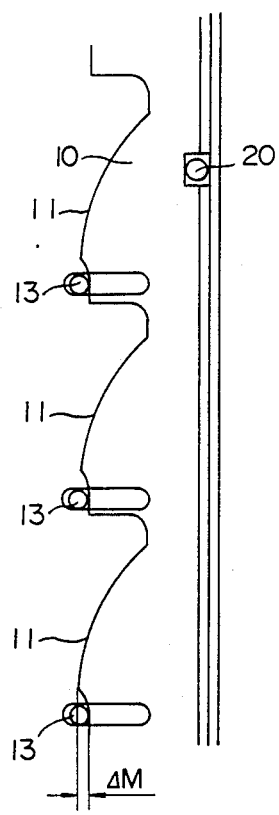

As a result, the guide pins 13, which are integral with the second lens group supporting frame 4 moves backward by an amount ΔM which corresponds to a change in the height of the drive cam surface 11, as shown in FIG. 14. In this way, the distance between the first and second lens groups 1 and 2 can be enlarged, with the first lens group 1 being left unmoved. It is therefore possible to conduct macrophotography without the need to extend the lens system as a whole. Thus, the arrangement of this embodiment is considerably advantageous for achieving a reduction in the overall size of the zoom lens barrel.

Since in the present invention the distance between the first and second lens groups 1 and 2 is determined by the position of the second lens group supporting frame 4 which is actuated by the rotation of the drive cam cylinder 10, variations in the distance between the two lens groups are exceedingly small as compared with a conventional mechanism in which the first and second lens groups are actuated independently of each other.

In this embodiment, the second lens group supporting frame 4 is constantly biased rearward by means of the coil springs 14 and therefore the guide pins 13 are constantly pressed against the drive cam surface 11. Thus, there is no play between the drive cam surface 11 and the guide pins 13 due to clearance, so that the distance between the first and second lens groups 1 and 2 can be controlled with considerably high accuracy, without variations.

Figure 15:
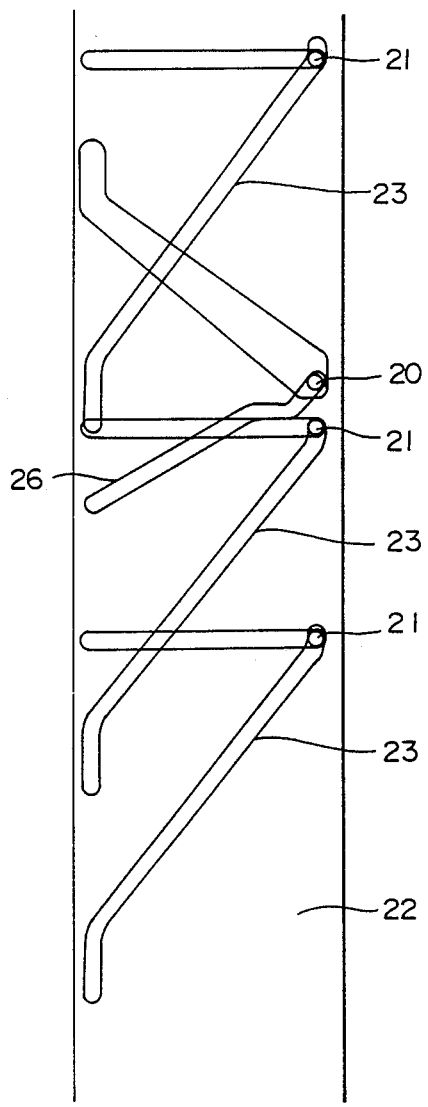
Figure 16:
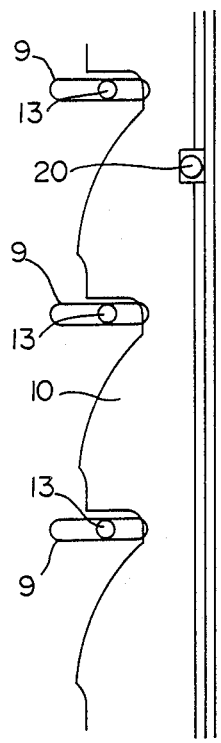
Figure 17:
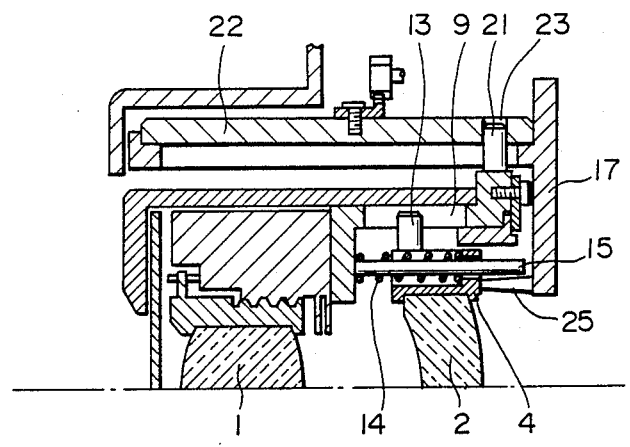

To put the lens system back in the lens barrel, a main switch (not shown) is turned off. As a result, the drive ring 22 rotates such that the lens system moves from the long focal length side toward the short focal length side beyond the shortest focal length position shown in FIG. 1. More specifically, as shown in FIG. 15, the guide pins 21 move as far as the respective rear ends of the first cam grooves 23, to move the first lens group supporting frame 3 rearward. Since this portion of the second cam groove 26 extends parallel with the first cam grooves 23, the guide pin 20 does not cause the drive cam cylinder 10 to rotate. Therefore, although the second lens group supporting frame 4 is urged to move rearward together with the first lens group supporting frame 3, the second lens group supporting frame 4, which is abutting against the stopper 25, is restrained from moving rearward. Accordingly, as shown in FIGS. 16 and 17, the coil springs serving as biasing means 14 are compressed, while the second lens group 2 remains substantially at the shortest focal length position. Thus, the first lens group 1 alone can be further withdrawn and thereby housed in the lens barrel. This arrangement is considerably advantageous because it is possible to avoid interference with the mechanical portions of the camera body and also prevents intrusion of dust from the film aperture portion.

To bring the zoom lens system, which is in the housed state, into the operative state shown in FIG. 1, the main switch (not shown) is turned on. Thus, an operation which the reverse of the above discussion is conducted.

Figure 18:
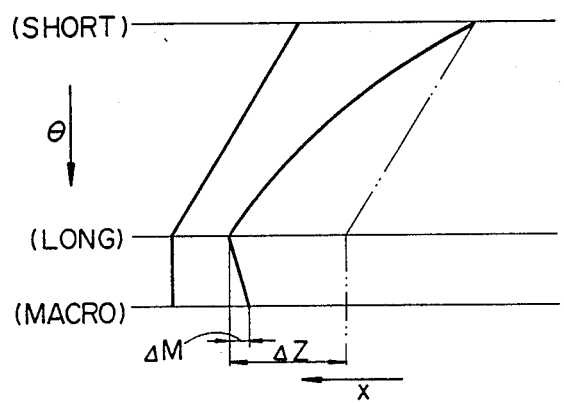
Figure 19:
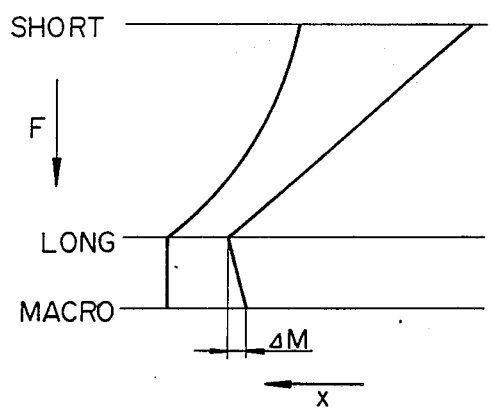

FIGS. 18 and 19 show the relationship between the amount of movement x of the first and second lens groups in the foregoing embodiment on the one hand and the angle ($\theta$) of rotation of the drive ring and the focal length (F) on the other. $\Delta Z$ in FIG. 18 represents the maximum amount of change in the distance between the first and second lens groups.

With the zoom lens barrel of the present invention, the distance between the first and second lens groups is determined only by the angle of rotation of the drive cam cylinder in a zooming operation and therefore errors due to variations in the distance between the lens groups are extremely small. Accordingly, it is possible to obtain a high degree of focusing accuracy stably at all times, even in the case of a zoom lens with a large zoom ratio in which a slight error in the distance between the lens groups leads to a large deviation from the in-focus position.

Since the drive ring need not be formed with a cam groove having a steep slope corresponding to the amount of movement of the second lens group, it is possible to shorten the overall length of the drive ring as compared with the prior art and hence realize a compact zoom lens barrel. Further, since it is unnecessary to extend the first lens group to conduct macrophotography, it is possible to incorporate the function of macrophotography without an increase in the overall length of the zoom lens barrel. Thus, it is possible to provide a compact zoom lens barrel with the macrophotography function.

FIGS. 21 to 33 show in combination a second embodiment of the zoom lens barrel according to the present invention.

Figure 21:
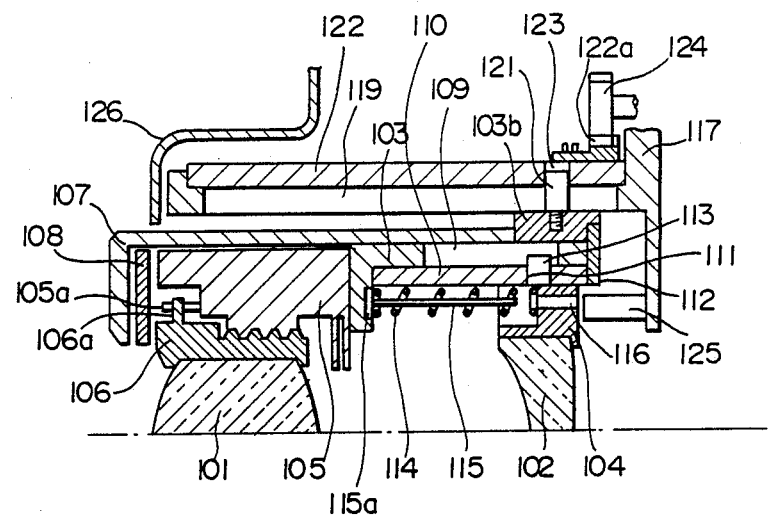
Figure 22:
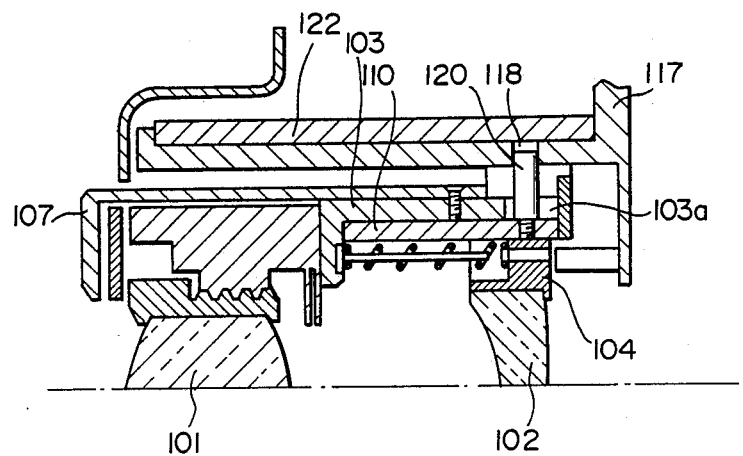
Figure 23:
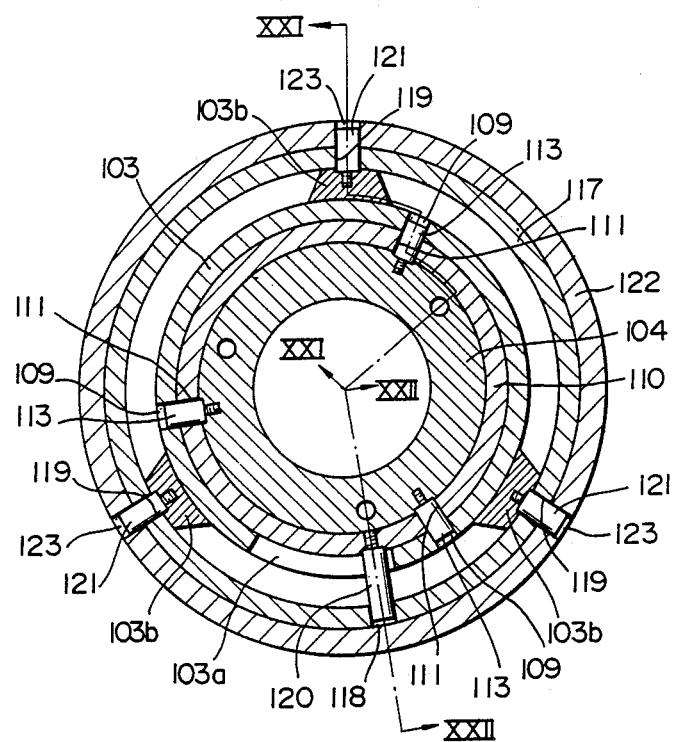
Figure 24:
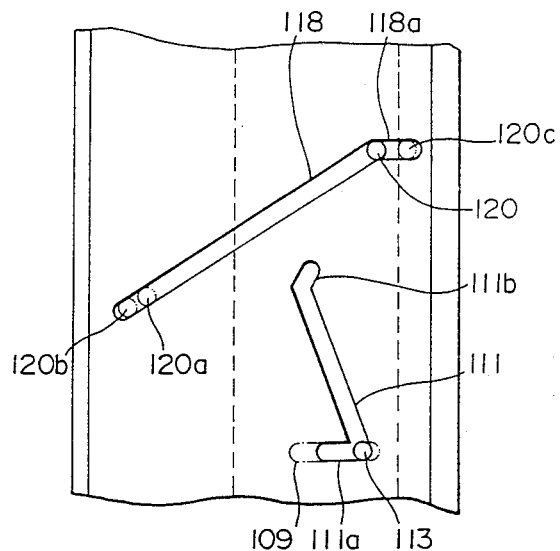
Figure 25:
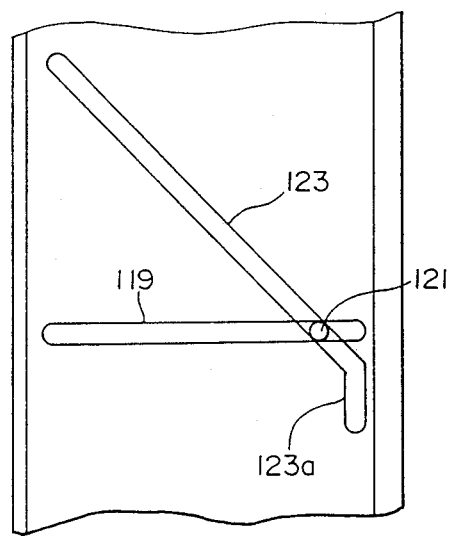

FIGS. 21 and 22 show a zoom lens barrel which is in the shortest focal length position as a result of a zooming operation, while FIG. 23 is a sectional front view showing the positional relationship between the cam grooves and guide pins provided in the zoom lens barrel. FIGS. 24 and 25 are development views showing the relationship between the cam grooves and the guide pins.

Reference numeral 103 denotes a first lens group supporting frame for supporting a first lens groups 101. The numeral 104 denotes a second lens group supporting frame for supporting a second lens group 102. An auto-focus unit 105 is rigidly secured to the first lens group supporting frame 103. The first lens group 101 is rigidly secured to the inner periphery of a helicoidal ring 106, which is in threaded engagement with the auto-focus unit 105. The first lens group 101 is driven in the direction of an optical axis for focusing by the operation of the auto-focus unit 105. More specifically, the auto-focus unit 105 activates an actuating pin 105a to rotate a predetermined amount around the optical axis in accordance with the camera-to-subject distance, thus causing an engagement piece 106a, engaged with the pin 105a, to rotate so as to extend the first lens group 101. Although in this embodiment the first lens group 101 is supported by the first lens group supporting frame 103 through both the auto-focus unit 105 and the helicoidal ring 106, the first lens group 101 may be supported directly by the supporting frame 103.

The reference numeral 107 denotes a cover which is rigidly secured to the first lens group supporting frame 103 by means of screws, while numeral 108 denotes a barrier which is arranged to move to the front side of the first lens group 101 so as to protect the lens surface when the camera is not used.

Axial straight grooves 109 are provided in the peripheral surface of the rear half of the first lens group supporting frame 103, and a cam cylinder 110 is fitted to the inner periphery of the first lens group supporting frame 103 in such a manner that the cam cylinder 110 is rotatable around the optical axis. Cam grooves 111 are formed in the cam cylinder 110. As shown in FIG. 24, each cam groove 111 has at one end thereof a straight groove 111a which extends axially and intersects the intermediate portion of the groove 111 at a sharp angle. The other end portion 111b of the cam groove 111 is bent at an obtuse angle so as to extend in the opposite direction to the direction in which the straight groove 111a does.

Reference numeral 112, shown in FIG. 21, denotes a stopper plate which is rigidly secured to the rear end of the first lens group supporting frame 103 so that the cam cylinder 110 is prevented from moving in the axial direction.

The second lens group supporting frame 104 is loosely fitted to the inner periphery of the cam cylinder 110. The second lens group supporting frame 104 has guide pins 113 projecting from the outer surface thereof. The guide pins 113 are engaged with both the straight grooves 109 and the cam grooves 111. It should be noted that a total of three sets of straight grooves 109, cam grooves 111 and guide pins 113 are provided at equal spacings of 120 degrees around the circumference. Rotatable guide rollers or the like may also be employed in lieu of the guide pins 113.

Coil springs 114 are interposed in between the first and second lens group supporting frames 103 and 104 in such a manner that the coil springs 114 constantly bias the second lens group supporting frame 104 rearward. Reference numeral 115 denotes rods which are received in the coil springs 114 so that the rods 115 serve as guides for the expansion and contraction of the respective coil springs 114. Top 115a of each rod 115 is pressed against and secured to the first lens group supporting frame 103 by the action of the corresponding coil spring 114. The second lens group supporting frame 104 is provided with relief bores 116 for the rods 115, so that the second lens group supporting frame 104 will not interfere with the rods 115 when the coil springs 114 are compressed.

Reference numeral 117 denotes a mounting frame which is secured to the camera body. The mounting frame 117 is provided with a cam groove 118 and axial straight grooves 119. The cam groove 118 is engaged with one guide pin 120 that is provided on the cam cylinder 110. The cam groove 118 has at the rear end thereof a straight portion 118a which extends axially, as shown in FIG. 24. The reference numeral 103a denotes a relief portion which is cut in the first lens group supporting frame 103 so that the guide pin 120 will not interfere with the supporting frame 103.

Three spacers 103b are rigidly secured to the outer surface of the rear end portion of the first lens group supporting frame 103 at equal spacings of 120 degrees, and guide pins 121 are provided on the spacers 103b, respectively. Accordingly, the guide pins 121 are connected to the first lens group supporting frame 103 in one unit through the respective spacers 103b. The spacers 103b are loosely fitted to the inner peripheral surface of the mounting frame 117, and a drive ring 122 is fitted on the outer periphery of the mounting frame 117 in such a manner that the drive ring 122 is rotatable around the optical axis. The guide pins 121, which are provided on the spacers 103b, are respectively engaged with both the straight grooves 119 in the mounting frame 117 and the cam grooves 123 in the drive ring 122. Each cam groove 123 has a circumferential groove portion 123a at the rear end thereof, as shown in FIG. 25.

A toothed member 122a is rigidly secured to the outer periphery of the drive ring 122 by means of screws, and a pinion 124 is meshed with the toothed member 122a, the pinion 124 being rotated by means of a driving motor (not shown). The arrangement may, of course, be such that the drive ring 122 is rotated by a manual operation through a manual operation ring or the like. The reference numeral 125 denotes a stopper which abuts against the rear end face of the second lens group supporting frame 104 to limit the rearward movement of the second lens group supporting frame 104, the stopper 125 projecting from the mounting frame 117. The reference numeral 126 denotes a cover for the lens barrel.

The following is a description of the operation of the second embodiment.

Figure 26:
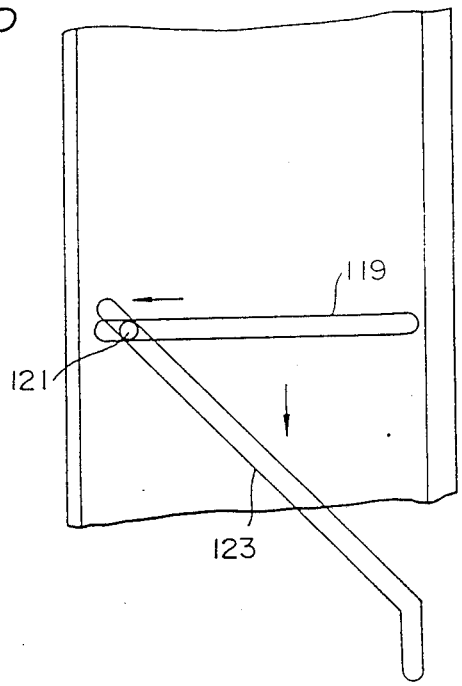

When the driving motor (not shown) is activated to rotate the pinion 124 when the zoom lens barrel is in the shortest focal length position shown in FIGS. 21 and 22, the drive ring 122 rotates around the optical axis. As a result, the guide pins 121, which are provided on the spacers 103b, are guided so as to move forward by the respective cam grooves 123 formed in the drive ring 122. FIG. 26 shows the guide pins 121 in this said state. As a result, the first lens group supporting frame 103 moves forward, together with the first lens group 101.

Figure 27:
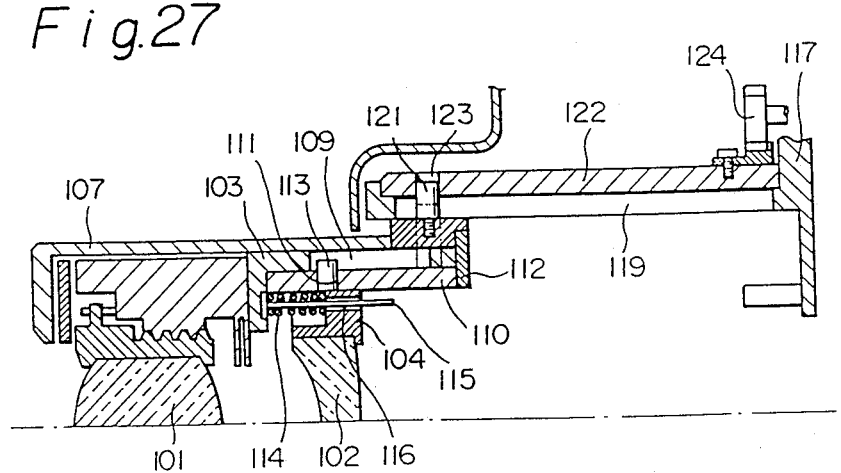
Figure 28:
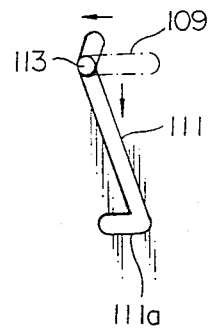

As the first lens group supporting frame 103 moves forward, the guide pin 120, which is provided on the cam cylinder 110, moves forward, as shown by the reference numeral 120a in FIG. 24, so that the guide pin 120, which is guided by the cam groove 118 in the mounting frame 117, rotates around the optical axis. The cam cylinder 110 rotates around the optical axis, the guide pins 113, which are provided on the second lens group supporting frame 104, move forward against the biasing force from the coil springs 114, as shown in FIG. 28. As a result, the second lens group supporting frame 104 moves forward and the second lens group 102 comes closer to the first lens group 101, as shown in FIG. 27. More specifically, the distance between the first and second lens groups 101 and 102 are determined by the cam grooves 111 formed in the cam cylinder 110, which is actuated in response to the axial movement of the first lens group supporting frame 103. In this way, the second lens group 102 moves forward by a distance which corresponds to the sum of the amount of movement of the first lens group supporting frame 103 and the amount of movement of the second lens group supporting frame 104.

When the zoom lens barrel is in the position shown in FIG. 27, the focal length is the longest. If the rotation of the pinion 124 is suspended in the course of reaching the illustrated position, the lens groups 101 and 102 are stopped halfway, producing an intermediate focal length. If the pinion 124 is reversed, the zoom lens barrel returns to the shortest focal length position shown in FIG. 21. Since, in the second embodiment of the invention, the distance between the first and second lens groups 101 and 102 is determined by the second lens group supporting frame 104, which is actuated by the movement of the first lens group supporting frame 103, variations in the distance between the two lens groups are exceedingly small as compared with a conventional mechanism in which the first and second lens groups are actuated independently of each other.

In this second embodiment, the second lens group supporting frame 104 is constantly biased rearward by means of the coil springs 114 and therefore the guide pins 113 are constantly pressed against the respective rear wall surfaces of the drive cam grooves 111. Accordingly, there is no play between the cam grooves 111 and the guide pins 113 due to clearance, so that the distance between the first and second lens groups 101 and 102 can be controlled with considerably high accuracy, without variations. In addition, since the second lens group supporting frame 104, the cam cylinder 110 and the like for driving it are accommodated within the first lens group supporting frame 103, it is possible to realize a compact zoom lens barrel.

Figure 29:
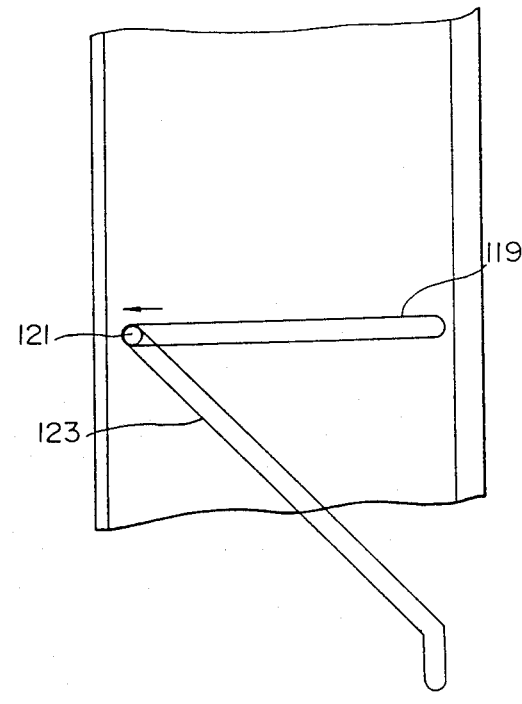
Figure 30:
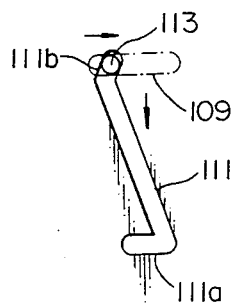

The zoom lens barrel according to the second embodiment also enables macrophotography. To carry out macrophotography, a switch (not shown) for macrophotography is turned on to activate the driving motor (not shown) to rotate the pinion 124 from the short focal length side toward the long focal length side beyond the longest focal length position shown in FIG. 27. The drive ring 122 further rotates around the optical axis and the guide pins 121, which are integral with the first lens group supporting frame 103, further move toward the forward end, as shown in FIG. 29. As a result, the first lens group supporting frame 103 further moves forward and the guide pin 120, which is provided on the cam cylinder 110, also moves forward, as shown by the reference numeral 120b in FIG. 24, and then the guide pin 120 rotates around the optical axis. Accordingly, the cam cylinder 110 rotates around the optical axis, so that the guide pins 113, which are provided on the second lens group supporting frame 104, enter the respective bent end portions 111b of the cam grooves 111, as shown in FIG. 30. As a result, the second lens group supporting frame 104 moves away from the first lens group 101. In this way, the distance between the first and second lens groups 101 and 102 increase while the entire lens system is being moved forward. Thus, it is possible to conduct macrophotography with a relatively small amount of extension of the lens system as a whole.

Figure 31:
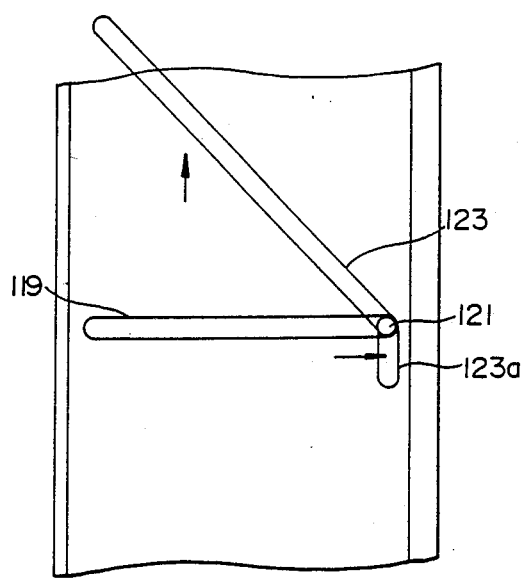

To retract the lens system back into the lens barrel, the main switch (not shown) is turned off. The pinion 124 is rotated by the driving motor (not shown) to activate the drive ring 122 to rotate so that the lens system moves from the long focal length side toward the short focal length side beyond the shortest focal length position shown in FIG. 21. More specifically, as shown in FIG. 31, the guide pins 121 move as far as the respective rear ends of the first cam grooves 123 so as to move the first lens group supporting frame 103 rearward. The guide pin 120, which is provided on the cam cylinder 110 enters the straight portion 118a at the rear end of the cam groove 118, as shown by the reference numeral 120c in FIG. 24, and therefore the guide pin 120 does not rotate. Accordingly, the cam cylinder 110 does not rotate, either.

Figure 32:
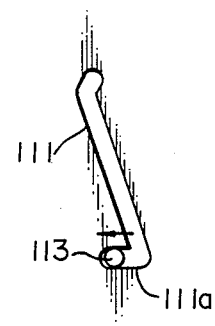
Figure 33:
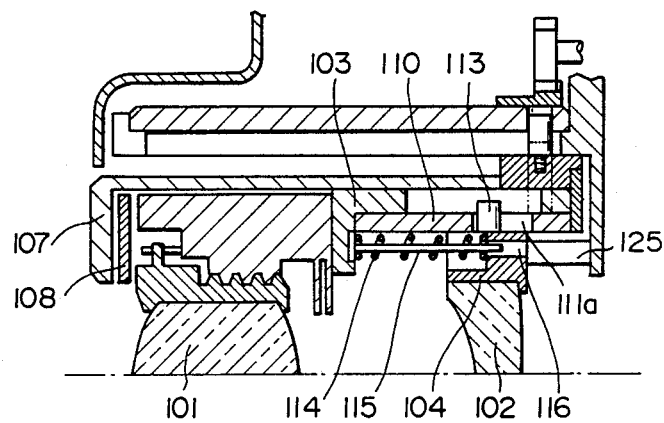

The second lens group supporting frame 104 is also urged to move rearward together with the first lens group supporting frame 103, but the second lens group supporting frame 104 is restrained from moving rearward by the stopper 125. On the other hand, the guide pins 113, which are provided on the second lens group supporting frame 104, enter the respective axial straight portions 111a of the cam grooves 111 formed in the cam cylinder 110, as shown in FIG. 32. Accordingly, the cam cylinder 110 alone is allowed to move rearward with the guide pins 113 remaining at their positions. FIG. 33 shows the zoom lens barrel in a state wherein the lens system is completely housed in the lens barrel. In this state, the coil springs 114 are compressed and the free end portions of the rods 115 enter the respective relief bores 116. In this way, the first lens group 101 alone is further withdrawn from the shortest focal length position without moving the second lens group 102 which is closer to the camera body, thereby reducing the overall size of the lens barrel in the lens housing state and thus enabling the zoom lens barrel to be readily carried.

Each of the cam grooves 123, which is formed in the drive ring 122 of this embodiment, is provided with a circumferential groove portion 123a for the purpose of obtaining the force required to actuate a mechanism (not shown) for opening and closing the barrier 108. Even after the lens system has been completely housed in the lens barrel, the drive ring 122 continues to rotate until the guide pins 121 reach the respective ends of the circumferential grooves 123a.

To bring the zoom lens system, which is in the housed state into the operative state shown in FIG. 21, the main switch (not shown) is turned on, reversing the operation discussed above.

Thus, according to the zoom lens barrel of the present invention, the distance between the first and second lens groups is determined only by one cam groove 111. Therefore errors due to variations in the distance between the lens groups are extremely small. Accordingly, it is possible to obtain a high degree of focusing accuracy at all times, even in the case of a zoom lens with a large zoom ratio in which a slight error in the distance between the lens groups leads to a large deviation from the in-focus position. Further, since there is substantially no need to extend the first lens group to conduct macrophotography, it is possible to incorporate the function of macrophotography with substantially no increase in the overall length of the zoom lens barrel. Thus, it is possible to provide a compact zoom lens barrel with the macrophotography function.

Figure 38:
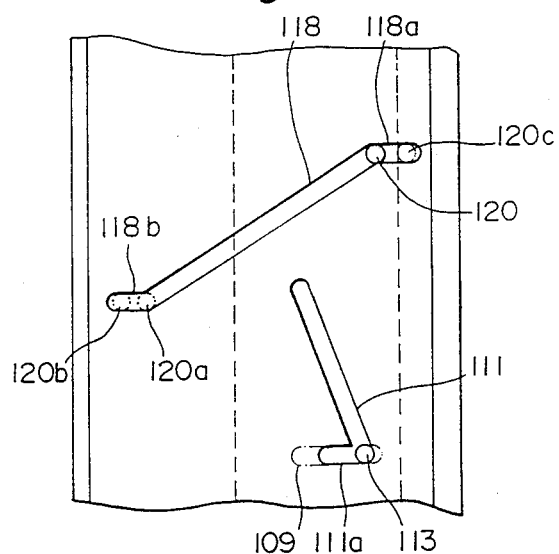
Figure 39:
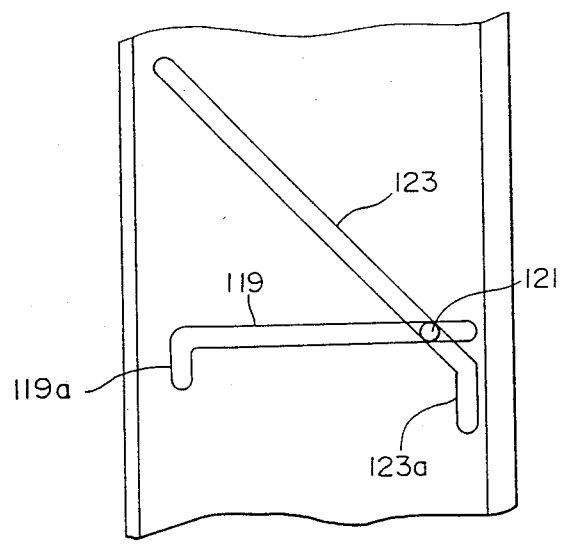

It should be noted that, if a straight portion 118b is formed at the forward end of the cam groove 118 and each straight groove 119 is bent at right angles at the forward end thereof to form a circumferential groove portion 119a, as shown in FIGS. 38 and 39, it is possible to conduct macrophotography with a further reduced amount of extension of the lens system. In this case, each cam groove 111 needs no bent end portion 111b.

In the case of the above described arrangement, when the driving motor (not shown) is activated to rotate the pinion 124 when the zoom lens barrel is in the shortest focal length position, the drive ring 122 rotates around the optical axis. As a result, the guide pins 121 which are provided on the spacers 103b are guided so as to move forward by the respective cam grooves 123.

Figure 40:
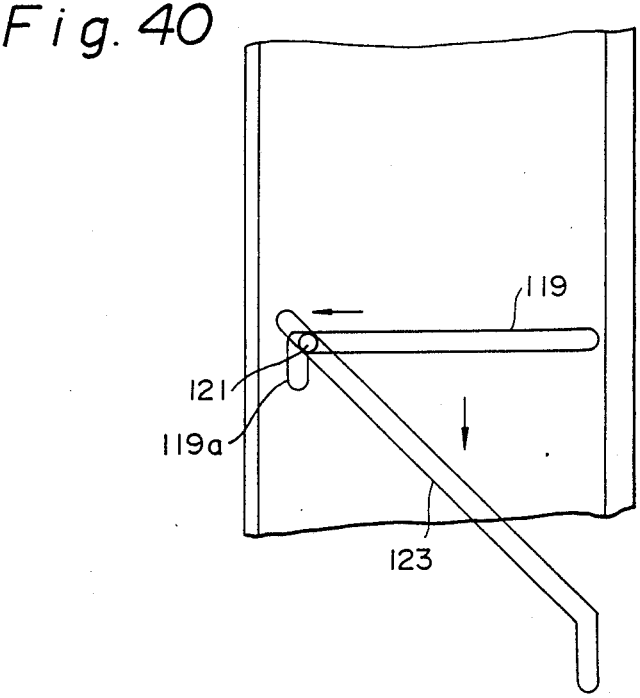
Figure 41:
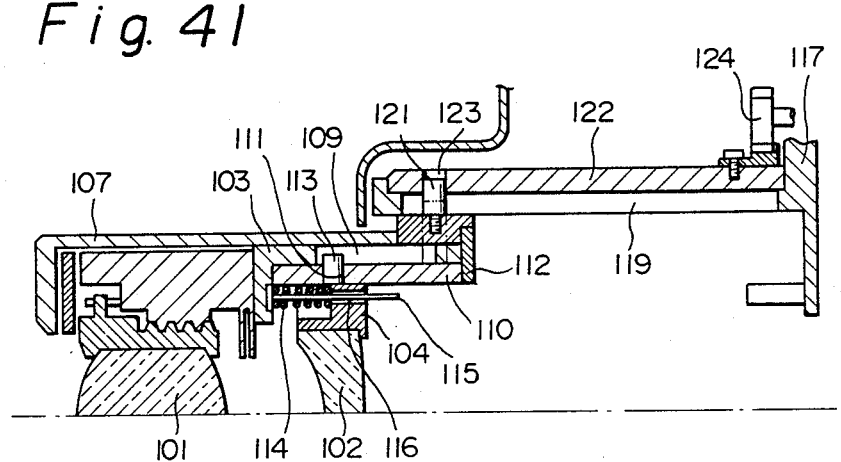

Referring to FIG. 40, which is a development view showing one guide pin 121 which is in the above described state, the guide pin 121 stops immediately in front of the forward end of the straight groove 119 (i.e., the length of the straight groove 119 is set so that the guide pin 121 stops at a position where it faces the forward end of the straight groove 119 at a distance which is equal to or more than the radius of the guide pin 121). Thus, the guide pin 121 stops at the position stably at all times without a fear of the guide pin 121 undesirably entering the circumferential groove portion 119a. As a result, the first lens group supporting frame 103 moves forward together with the first lens group 101. Further, the second lens group 102 moves forward by a distance which corresponds to the sum of the amount of movement of the first lens group supporting frame 103 and the amount of movement of the second lens group supporting frame 104. FIG. 41, which is similar to FIG. 27, shows the zoom lens barrel in this state.

Figure 42:
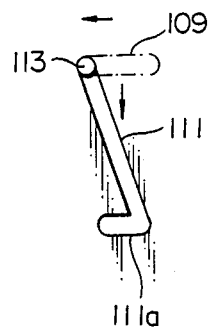

When the zoom lens barrel is in the position shown in FIG. 41, the focal length is the longest and, in this state, each of the guide pins 113 is at the forward extremity of its travel, as shown in FIG. 42.

Figure 43:
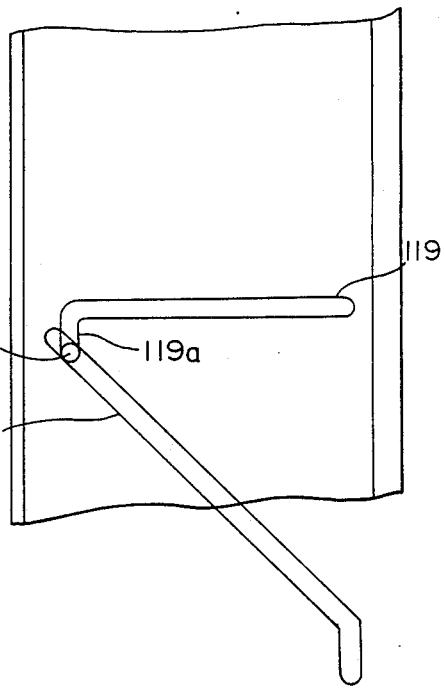
Figure 44:
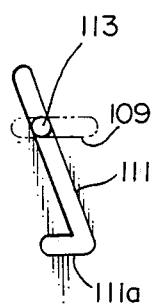
Figure 45:
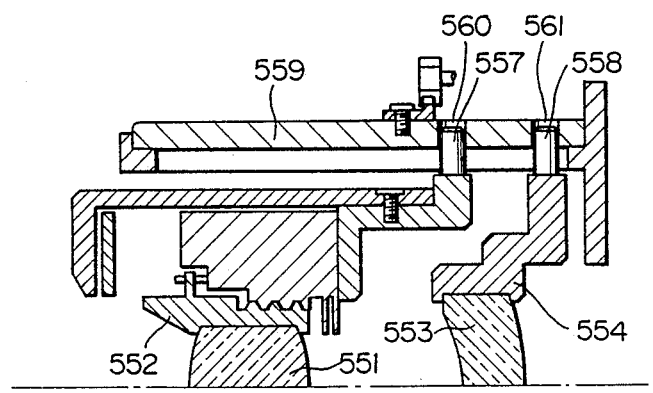
FIG. 45 is a fragmentary sectional side view showing an upper-half portion of a zoom lens barrel according to the prior art.

To carry out macrophotography, a switch (not shown) for macrophotography is turned on to activate the driving motor (not shown) so as to rotate the pinion 124 from the short focal length side toward the long focal length side beyond the longest focal length position shown in FIG. 41. In consequence, the drive ring 122 rotates around the optical axis and the guide pins 121 which are integral with the first lens group supporting frame 103, enter the respective circumferential groove portions 119a provided in the mounting frame 117 and move in the circumferential direction, as shown in FIG. 43. As a result, the first lens group supporting frame 103 rotates around the optical axis. On the other hand, the guide pin 120, which is provided on the cam cylinder 110, enters the straight portion 118b provided at the forward end of the cam groove 118 formed in the mounting frame 117, as shown by the reference numeral 120b in FIG. 38, so that the cam cylinder 110 does not rotate. As a result, the straight grooves 109, which are provided in the first lens group supporting frame 103, rotate around the optical axis with respect to the corresponding cam grooves 111 provided in the cam cylinder 110, so that the guide pins 113, which are provided on the second lens group supporting frame 104, move rearward, as shown in FIG. 44. Thus, the first lens group 101 does not move forward but rotates around the optical axis, while the second lens group 102 moves rearward, so that the distance between the first and second lens groups 101 and 102 increase to attain a macrophotography state.

It should be noted that in the above-described embodiment, in order to bring the lens system into a macrophotography state from the longest focal length position, it is necessary to move forward the first lens group supporting frame 103 by a distance which is substantially equal to the radius of the guide pin 121; however, the amount of forward movement of the first lens group supporting frame 103 is considered to be extremely small. If necessary, the amount of forward movement of the first lens group supporting frame 103 in macrophotography may be made zero. Thus, according to the present invention, there is no need to extend the first lens group to conduct macrophotography and it is therefore possible to incorporate the function of macrophotography with no increase in the overall length of the zoom lens barrel. Accordingly, it is possible to provide a compact zoom lens barrel with the macrophotography function.

FIGS. 34 to 37 show in combination a third embodiment of the zoom lens barrel according to the present invention.

Figure 34:
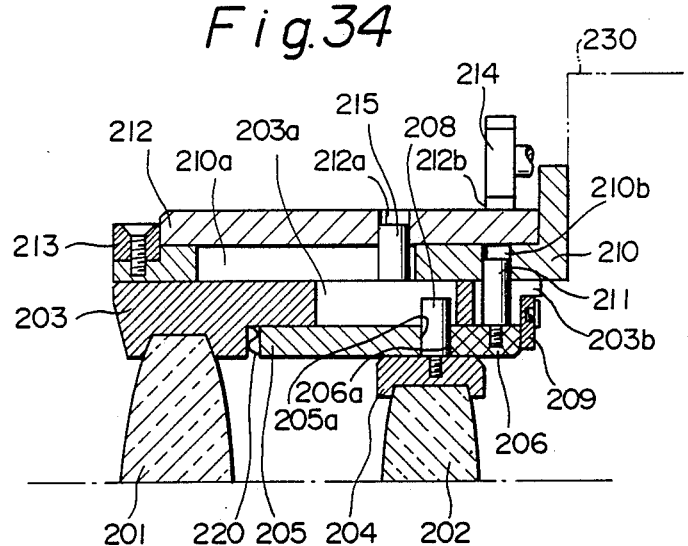
Figure 36:
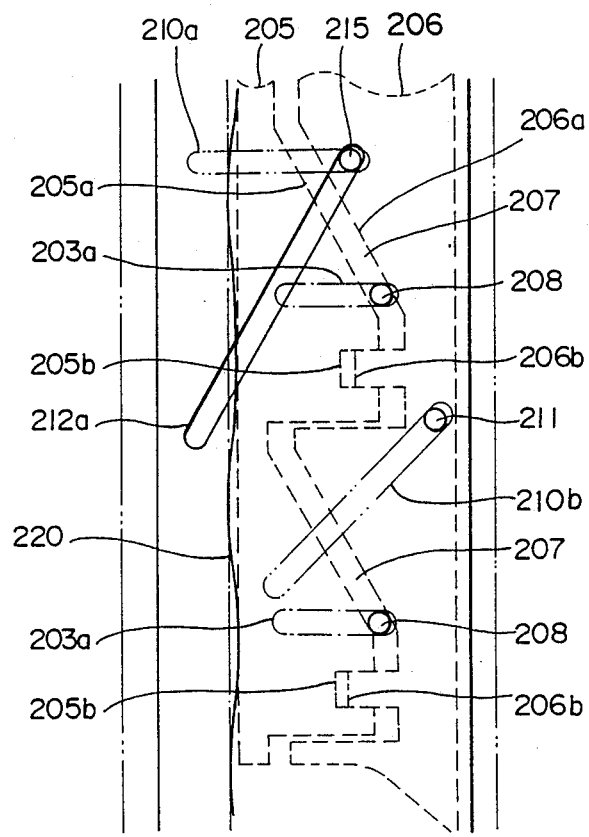

FIG. 34 shows the zoom lens barrel in a state wherein the lens groups are adjusted so that the focal length is the shortest (e.g., 35 mm). FIG. 36 is a development view showing the relationship between a plurality of cam grooves and guide pins, which are formed in the mechanism, when the zoom lens barrel is in the state shown in FIG. 34. In FIG. 36, the cam grooves are illustrated with different kinds of line.

Reference numeral 203 denotes a first lens group supporting cylinder for retaining a first lens group 201 at the forward end thereof. The first lens group supporting cylinder 203 has axial guide grooves 203a which are provided in the intermediate portion thereof and relief portions 203b which are formed in the rear end portion thereof so as to avoid interference with guide pins 211 (described later).

Reference numeral 204 denotes a second lens group supporting frame for retaining a second lens group 202. Reference numerals 205 and 206 denote cam cylinder members which are loosely fitted to the inner periphery of the first lens group supporting cylinder 203. The cam cylinder members 205 and 206 constitute in combination a split cam cylinder. More specifically, the cam cylinder members 205 and 206 are combined together with their complementary cam surfaces 205a and 206a facing each other so as to define cam grooves 207 therebetween. The second lens group supporting frame 204 is loosely fitted inside the split cam cylinder (205 and 206). Guide pins 208, which are provided on the outer periphery of the second lens group supporting frame 204, are respectively engaged with both the cam grooves 207 and the guide grooves 203a.

A wave washer-shaped resilient member 220 is compressingly interposed between the forward end of the cam cylinder (205 and 206) and the first lens group supporting cylinder 203 to bias the cam cylinder members 205 and 206 toward an abutment plate 209, which is rigidly secured to the rear end face of the first lens group supporting cylinder 203. The cam cylinder members 205 and 206 are provided with a recess 205b and a projection 206b, respectively, such that the recess 205b and the projection 206b are engageable with each other. Thus, the cam cylinder members 205 and 206 are movable relative to each other in the axial direction but, when rotated around the axis, they move together as one unit. It should be noted that in this embodiment, a plurality of sets of guide grooves 203a, cam grooves 207 and guide pins 208 are provided at predetermined spacings around the circumference.

By virtue of the above-described arrangement, as the cam cylinder members 205 and 206 are rotated, the guide pins 208 are guided by the cam grooves 207 and the guide grooves 203a, so that the second lens group 202 moves along the optical axis to vary the distance between the first and second lens groups 201 and 202.

Reference numeral 210 denotes a lens barrel body which is detachably or semipermanently secured to a camera body 230. The lens barrel body 210 is provided with an axial straight groove 210a and a cam groove 210b. The head portion of a guide pin 211, which is provided on the cam cylinder member 206, engages with the cam groove 210b. A relief portion 203b is circumferentially cut in the first lens group supporting cylinder 203 to a substantial extent so that there is no interference within the range of travel of the guide pin 211.

A drive ring 212 is rotatably fitted to the outer periphery of the lens barrel body 210. Reference numeral 213 denotes a stopper ring which limits the axial movement of the drive ring 212, the stopper ring 213 being rigidly secured to the lens barrel body 210 by means of screws. The drive ring 212 is provided with a cam groove 212a and a toothed portion 212b which is formed on the outer periphery thereof. A pinion 214 is meshed with the toothed portion 212b. The pinion 214 is rotated by a driving motor (not shown). The drive ring 214 may, of course, be rotated by a manual operation through a manual operation ring or the like. A guide pin 215, which is provided on the first lens group supporting cylinder 203, is engaged with both the straight groove 210a in the lens barrel body 210 and the cam groove 212a in the drive ring 212.

The following is a description of the operation of the zoom lens barrel according to the third embodiment.

As the drive ring 212 is rotated through the pinion 214, the guide pin 215, which is engaged with the cam groove 212a, moves along the axis of the lens barrel together with the first lens group supporting cylinder 203. Thus, the first lens group 201 is moved forward or rearward. The movement of the first lens group supporting cylinder 203 causes the cam cylinder members 205 and 206 to move. However, since the guide pin 211, which is provided on the cam cylinder member 206, is engaged with the cam groove 210b, the cam cylinder members 205 and 206 are forced to rotate while moving axially. As a result, the second lens group 202 moves axially relative to the first lens group 201 through the guide pins 208 which are in engagement with the cam grooves 207 defined between the cam cylinder members 205 and 206, thus, varying the distance between the first and second lens groups 201 and 202.

Figure 35:
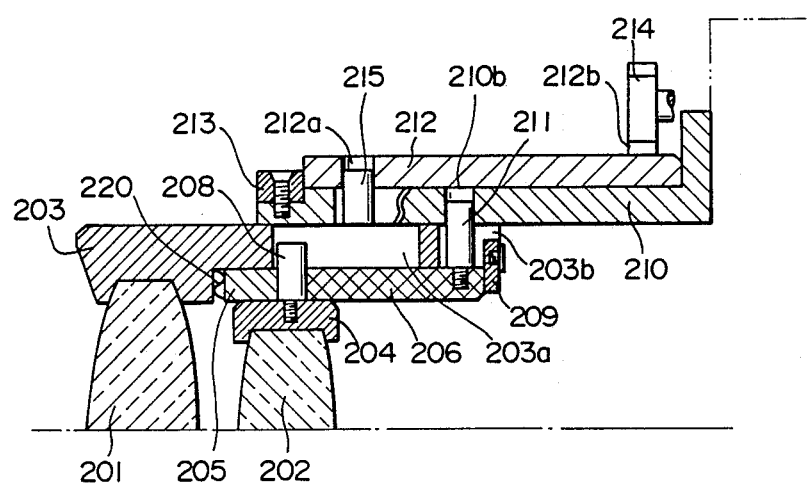
Figure 37:
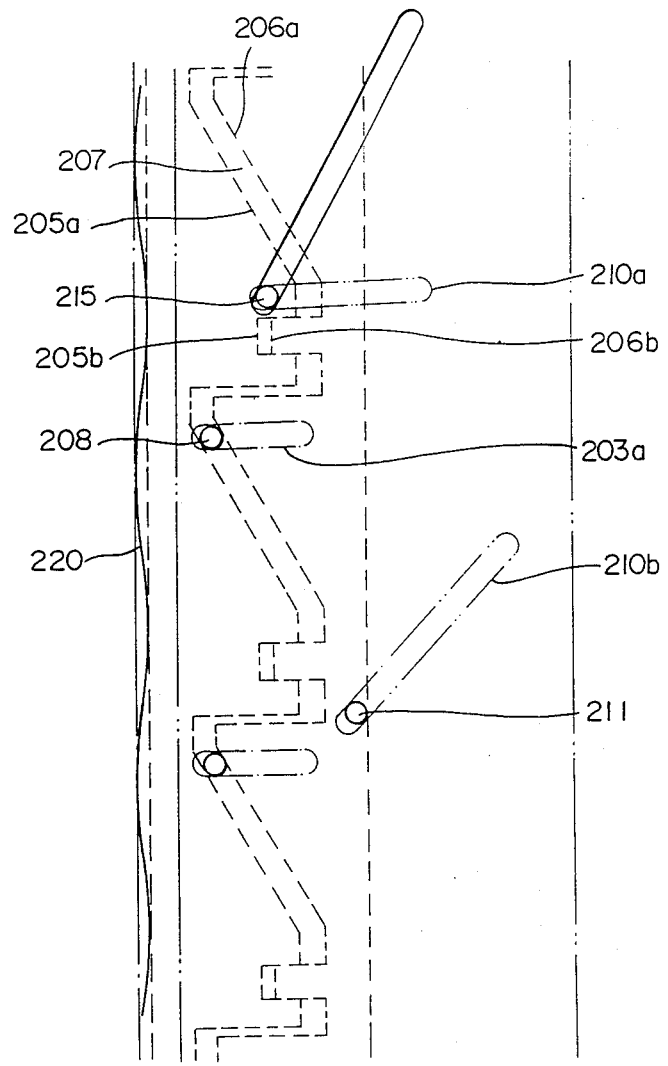

FIG. 35 shows the zoom lens barrel in a state wherein the lens groups 201 and 202 are most extended. In this state, the first lens group 201 is extended as far as the forward extremity of its travel and the second lens group 202 is also extended as far as the extremity of its travel where it is closest to the first lens group 201. In this embodiment, the focal length is the longest (e.g., 70 mm). FIG. 37 is a development view showing the positional relationship between the cam grooves and the guide pins in this state.

In this embodiment, the cam cylinder members 205 and 206 rotate in response to the rotation of the pinion 214, causing the guide pins 208 to move back and forth along the optical axis. Since the cam cylinder members 205 and 206 are constantly biased rearward by means of the resilient member 220, the cam surfaces 205a and 206a are constantly in close contact with the guide pins 208 in such a manner that the guide pins 208 are clamped between the cam surfaces 205a and 206a. Over the entire range of operation of the mechanism of this embodiment, the spacing between the cam surfaces 205a and 206a is constantly equal to the diameter of the guide pins 208; therefore, there is no change in the amount of compression of the resilient member 220 and the biasing force is maintained at a constant level.

It should be noted that, although the above-described split cam cylinder comprises two cam cylinder members which are combined together with their cam surfaces facing each other, the split cam cylinder may comprise three or more members.

As has been described above, the zoom lens barrel according to the present invention has no clearance between the guide pins and the cam grooves. Therefore, when the first and second lens groups are moved to obtain a particular focal length, there is no variation in the distance between the first and second lens groups between the case where these lens groups are moved toward each other and the case where they are moved away from each other. In addition, since the amount of displacement of the resilient member is maintained at a constant level at all times, there is no variation in the level of the biasing force. Accordingly, it is possible to activate the lens groups to move back and forth with a constant level of force at all times. Thus, it is possible to stabilize the operation and achieve a reduction in the size of the driving motor.

It should be noted that the mechanism according to the third embodiment (shown in FIG. 34 to 37) may be applied not only to a zoom mechanism but also to a lens driving mechanism for adjusting lens groups to effect focusing.

While the invention has been described by reference to specific embodiments chosen for purposes of illustration, it should be apparent that numerous modifications could be made thereto by those skilled in the art without departing from the basic concept and scope of the invention.

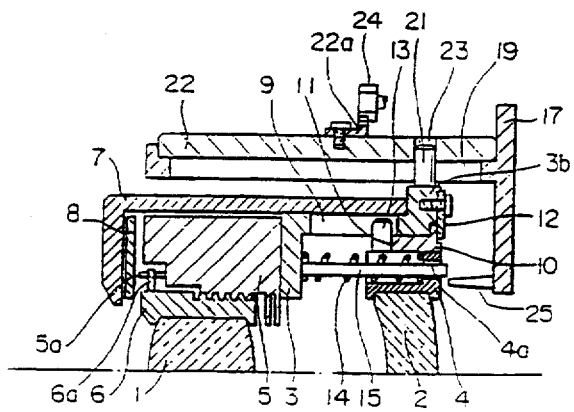

I claim:

1. A zoom lens barrel having first and second lens groups which are moved through different distances along an optical axis in interlocking relation to each other to effect zooming, comprising:
   a first lens group supporting means for supporting said first lens group, said first lens group supporting means being movable along said optical axis;
   a second lens group supporting means for supporting said second lens group, said second lens group supporting means being supported by said first lens group supporting means in such a manner that said second lens group supporting means is movable along said optical axis relative to said first lens group supporting means;
   a drive ring provided in such a manner as to be rotatable around said optical axis to cause said first lens group supporting means to move back and forth along said optical axis; and drive cam means fitted to said first lens group supporting means in such a manner as to be rotatable around said optical axis, said drive cam means being rotated by said drive ring so as to cause said second lens group supporting means to move back and forth along said optical axis relative to said first lens group supporting means.

2. A zoom lens barrel according to claim 1, wherein said first lens group is supported by said first lens group supporting means through a focusing means.

3. A zoom lens barrel according to claim 1, wherein said second lens group supporting means is provided inside said first lens group supporting means.

4. A zoom lens barrel according to claim 1, wherein said drive ring is provided with a first cam groove for causing said first lens group supporting means to move back and forth along said optical axis and a second cam groove for causing said drive cam means to rotate around said optical axis.

5. A zoom lens barrel according to claim 1, wherein said drive cam means is provided with a cam surface for determining the position of said second lens group supporting means.

6. A zoom lens barrel having first and second lens groups which are moved through different distances along an optical axis in interlocking relation to each other to effect zooming, comprising:

a first lens group supporting means for supporting said first lens group, said first lens group supporting means being movable along said optical axis;

a second lens group supporting means for supporting said second lens group, said second lens group supporting means being supported by said first lens group supporting means in such a manner that said second lens group supporting means is movable along said optical axis relative to said first lens group supporting means;

a drive ring provided in such a manner as to be rotatable around said optical axis to cause said first lens group supporting means to move back and forth along said optical axis; and drive cam means fitted to said first lens group supporting means in such a manner as to be rotatable around said optical axis, said drive cam means being rotated by said drive ring so as to cause said second lens group supporting means to move back and forth along said optical axis relative to said first lens group supporting means, said drive cam means being provided with a cam surface for determining the position of said second lens group supporting means, while said second lens group supporting means is provided with a guide pin which is pressed against said cam surface of said drive cam means by a means for biasing said second lens group supporting means.

7. A zoom lens barrel according to claim 6, wherein said biasing means is a coil spring.

8. A zoom lens barrel according to claim 6, wherein said first lens group supporting means is provided with a straight groove extending in the direction of said optical axis, said guide pin being engaged with said straight groove so as to move along said straight groove.

9. A zoom lens barrel having first and second lens groups which are moved through different distances along an optical axis in interlocking relation to each other to effect zooming, comprising:

a first lens group supporting means for supporting said first lens group, said first lens group supporting means being movable along said optical axis;

a second lens group supporting means for supporting said second lens group, said second lens group supporting means being supported by said first lens group supporting means in such a manner that said second lens group supporting means is movable along said optical axis relative to said first lens group supporting means;

a drive ring provided in such a manner as to be rotatable around said optical axis to cause said first lens group supporting means to move back and forth along said optical axis; and drive cam means fitted to said first lens group supporting means in such a manner as to be rotatable around said optical axis, said drive cam means being rotated by said drive ring so as to cause said second lens group supporting means to move back and forth along said optical axis relative to said first lens group supporting means, wherein, when said drive ring is rotated from a short focal length side toward a long focal length side, said first lens group supporting means moves forward along said optical axis and, at the same time, said second lens group supporting means is caused by said drive cam means to move forward along said optical axis more than said first lens group supporting means, so that said first and second lens groups come closer to each other.

10. A zoom lens barrel having first and second lens groups which are moved through different distances along an optical axis in interlocking relation to each other to effect zooming, comprising:

a first lens group supporting means for supporting said first lens group, said first lens group supporting means being movable along said optical axis;

a second lens group supporting means for supporting said second lens group, said second lens group supporting means being supported by said first lens group supporting means in such a manner that said second lens group supporting means is movable along said optical axis relative to said first lens group supporting means;

a drive ring provided in such a manner as to be rotatable around said optical axis to cause said first lens group supporting means to move back and forth along said optical axis; and drive cam means fitted to said first lens group supporting means in such a manner as to be rotatable around said optical axis, said drive cam means being rotated by said drive ring so as to cause said second lens group supporting means to move back and forth along said optical axis relative to said first lens group supporting means, wherein, when said drive ring is rotated from a short focal length side toward a long focal length side beyond a longest focal length position, said first lens group supporting means does not move beyond said longest focal length position, while said second lens group supporting means is caused by said drive cam means to move backward along said optical axis, thereby attaining a macrophotography state.

11. A zoom lens barrel having first and second lens groups which are moved through different distances along an optical axis in interlocking relation to each other to effect zooming, comprising:
- a first lens group supporting means for supporting said first lens group, said first lens group supporting means being movable along said optical axis;
- a second lens group supporting means for supporting said second lens group, said second lens group supporting means being supported by said first lens group supporting means in such a manner that said second lens group supporting means is movable along said optical axis relative to said first lens group supporting means;
- a drive ring provided in such a manner as to be rotatable around said optical axis to cause said first lens group supporting means to move back and forth along said optical axis; and
- drive cam means fitted to said first lens group supporting means in such a manner as to be rotatable around said optical axis, said drive cam means being rotated by said drive ring so as to cause said second lens group supporting means to move back and forth along said optical axis relative to said first lens group supporting means, wherein, when said drive ring is rotated from a long focal length side toward a short focal length side beyond a shortest focal length position, said first lens group supporting means moves backward along said optical axis.

12. A zoom lens barrel according to claim 11, wherein, when said drive ring is rotated from a long focal length side toward a short focal length side beyond a shortest focal length position, said second lens group supporting means abuts against a stopper and thus stops moving.

13. A zoom lens barrel having first and second lens groups which are moved through different distances along an optical axis in interlocking relation to each other to effect zooming, comprising:
- a first lens supporting means for supporting said first lens group;
- a second lens group supporting means for supporting said second lens group, said second lens group supporting means being supported by said first lens group supporting means in such a manner that said second lens group supporting means is movable along said optical axis relative to said first lens group supporting means;
- a first drive means for driving said first lens group supporting means to move back and forth along said optical axis; and
- a second drive means for driving said second lens group supporting means to move back and forth along said optical axis relative to said first lens group supporting means in response to the movement of said first lens group supporting means.

14. A zoom lens barrel according to claim 13, wherein said first lens group is supported by said first lens group supporting means through a focusing means.

15. A zoom lens barrel according to claim 13, wherein said first drive means is provided with a cam groove for causing said first lens group supporting means to move back and forth along said optical axis.

16. A zoom lens barrel having first and second lens groups which are moved through different distances along an optical axis in interlocking relation to each other to effect zooming, comprising:
- a first lens supporting means for supporting said first lens group;
- a second lens group supporting means for supporting said second lens group, said second lens group supporting means being supported by said first lens group supporting means in such a manner that said second lens group supporting means is movable along said optical axis relative to said first lens group supporting means;
- a first drive means for driving said first lens group supporting means to move back and forth along said optical axis; and
- a second drive means for driving said second lens group supporting means to move back and forth along said optical axis relative to said first lens group supporting means in response to the movement of said first lens group supporting means, wherein said second drive means includes a guide groove rotated in response to the axial movement of said first lens group supporting means, a guide pin being provided on said second lens group supporting means, said guide pin being engaged with said guide groove, and biasing means for pressing said guide pin against a wall surface of said guide groove.

17. A zoom lens barrel according to claim 16, wherein said biasing means is a coil spring.

18. A zoom lens barrel according to claim 16, wherein said first lens group supporting means is provided with a straight groove extending in the direction of said optical axis, said guide pin being engaged with said straight groove so as to move along said groove.

19. A zoom lens barrel having first and second lens groups which are moved through different distances along an optical axis in interlocking relation to each other to effect zooming, comprising:
- a first lens supporting means for supporting said first lens group;
- a second lens group supporting means for supporting said second lens group, said second lens group supporting means being supported by said first lens group supporting means in such a manner that said second lens group supporting means is movable along said optical axis relative to said first lens group supporting means;
- a first drive means for driving said first lens group supporting means to move back and forth along said optical axis; and
- a second drive means for driving said second lens group supporting means to move back and forth along said optical axis relative to said first lens group supporting means in response to the movement of said first lens group supporting means, wherein, when said first drive means is activated from a short focal length side toward a long focal length side, said first lens group supporting mean moves forward along said optical axis and, at the same times, said second lens group supporting means is caused by said second drive means to move forward along said optical axis more than said first lens group supporting means, so that said first and second lens groups come closer to each other.

20. A zoom lens barrel having first and second lens groups which are moved through different distances along an optical axis in interlocking relation to each other to effect zooming, comprising:
- a first lens supporting means for supporting said first lens group;

a second lens group supporting means for supporting said second lens group, said second lens group supporting means being supported by said first lens group supporting means in such a manner that said second lens group supporting means is movable along said optical axis relative to said first lens group supporting means;

a first drive means for driving said first lens group supporting means to move back and forth along said optical axis; and a second drive means for driving said second lens group supporting means to move back and forth along said optical axis relative to said first lens group supporting means in response to the movement of said first lens group supporting means, wherein, when said first drive means is activated from a short focal length side toward a long focal length side beyond a longest focal length position, said first lens group supporting means further moves forward along said optical axis and, at the same time, said second lens group supporting means is caused by said second drive means to move backward along said optical axis, thereby attaining a macrophotography state.

21. A zoom lens barrel having first and second lens groups which are moved through different distances along an optical axis in interlocking relation to each other to effect zooming, comprising:

a first lens supporting means for supporting said first lens group;

a second lens group supporting means for supporting said second lens group, said second lens group supporting means being supported by said first lens group supporting means in such a manner that said second lens group supporting means is movable along said optical axis relative to said first lens group supporting means;

a first drive means for driving said first lens group supporting means to move back and forth along said optical axis; and a second drive means for driving said second lens group supporting means to move back and forth along said optical axis relative to said first lens group supporting means in response to the movement of said first lens group supporting means, wherein, when said first drive means is activated from a short focal length side toward a long focal length side beyond a longest focal length position, said first lens group supporting means does not move beyond said longest focal length position, while said second lens group supporting means is caused by said second drive means to move backward along said optical axis, thereby attaining a macrophotography state.

22. A zoom lens barrel having first and second lens groups which are moved through different distances along an optical axis in interlocking relation to each other to effect zooming, comprising:

a first lens supporting means for supporting said first lens group;

a second lens group supporting means for supporting said second lens group, said second lens group supporting means being supported by said first lens group supporting means in such a manner that said second lens group supporting means is movable along said optical axis relative to said first lens group supporting means;

a first drive means for driving said first lens group supporting means to move back and forth along said optical axis; and a second drive means for driving said second lens group supporting means to move back and forth along said optical axis relative to said first lens group supporting means in response to the movement of said first lens group supporting means, wherein, when said first drive means is activted from a short focal length side toward a short focal length side beyond a shortest focal length position, said first lens group supporting means moves backward along said optical axis.

23. A zoom lens barrel according to claim 22, wherein, when said first drive means is rotated from said long focal length side toward said short focal length side beyond said shortest focal length position, said second lens group supporting means abuts against a stopper and thus stops moving.

24. A zoom lens barrel having first and second lens groups which are moved through different distances along an optical axis in interlocking relation to each other to effect zooming, comprising:

a first lens group supporting cylinder for supporting said first lens group;

a second lens group supporting means for supporting said second lens group, said second lens group supporting means being supported by said first lens group supporting cylinder in such a manner that said second lens group supporting means is movable along said optical axis relative to said first lens group supporting cylinder;

a drive means for driving said first lens group supporting cylinder to move back and forth along said optical axis;

a split cam cylinder comprising two cam cylinder members which are combined together so as to define a cam groove therebetween for driving said second lens group supporting means to move along said optical axis;

a guide pin provided on said second lens group supporting means said guide pin being engaged with said cam groove; and a resilient member for biasing said cam cylinder toward said first lens group supporting cylinder in the direction of said optical axis, thereby constantly bringing both wall surfaces of said cam groove into close contact with said guide pin.

25. A zoom lens barrel according to claim 24, wherein said cam cylinder is provided with means for preventing said cam cylinder members from rotating relative to each other.

26. A zoom lens barrel according to claim 24, wherein said cam cylinder rotates in response to an axial movement of said first lens group supporting cylinder.

27. A zoom lens barrel having first and second lens groups which are moved through different distances along an optical axis in interlocking relation to each other to effect zooming, comprising:

a first lens group supporting means for supporting said first lens group;

a second lens group supporting means for supporting said second lens group, said second lens group supporting means being provided inside said first lens group supporting means in such a manner that said second lens group supporting means is movable along said optical axis relative to said first lens group supporting means; and drive means for driving said second lens group supporting means to move back along said optical axis relative to said first lens group supporting means, when said first lens group supporting means is in a longest focal length position.

* * * * *

UNITED STATES PATENT AND TRADEMARK OFFICE
CERTIFICATE OF CORRECTION

PATENT NO. : B1 4,974,949
DATED : June 4, 1996
INVENTOR(S) : H. TANAKA

It is certified that error appears in the above-indentified patent and that said Letters Patent is hereby corrected as shown below:

The Title page should be deleted and substitute therefor the attached Title page reflecting correct Reexam. No. B1 4,974,949.

Title page item [30], "Foreign Application Priority Data", column 1, line 4, change "62-242099" to ---63-242099---.

Title page item [56], "References Cited", "U.S. PATENT DOCUMENTS", column 1, line 1, change "3,244,884" to ---3,744,884---.

Signed and Sealed this

Eighteenth Day of March, 1997

Attest:

BRUCE LEHMAN

*Attesting Officer*  Commissioner of Patents and Trademarks

REEXAMINATION CERTIFICATE (2902th)
United States Patent [19]
Tanaka

B1 4,974,949

[45] Certificate Issued  Jun. 4, 1996

[54] ZOOM LENS BARREL

[75] Inventor: Hitoshi Tanaka, Tokyo, Japan

[73] Assignee: Asahi Kogaku Kogyo Kabushiki Kaisha, Tokyo, Japan

Reexamination Request:
No. 90/003,601, Oct. 14, 1994

Reexamination Certificate for:
Patent No.: 4,974,949
Issued: Dec. 4, 1990
Appl. No.: 285,030
Filed: Dec. 16, 1988

[30] Foreign Application Priority Data

| Dec. 21, 1987 | [JP] | Japan | 62-323246 |
| Dec. 21, 1987 | [JP] | Japan | 62-323247 |
| Dec. 21, 1987 | [JP] | Japan | 62-323248 |
| Sep. 26, 1988 | [JP] | Japan | 62-242099 |

[51] Int. Cl.$^6$ .............. G02B 15/14; G02B 15/00
[52] U.S. Cl. .............. 359/704; 354/195.12

[56] References Cited

U.S. PATENT DOCUMENTS

| 3,244,884 | 7/1973 | Filipovich et al. ......... 359/826 |
| 4,074,931 | 2/1978 | Okudaira . |
| 4,275,952 | 6/1981 | Uesugi . |
| 4,324,457 | 4/1982 | Tomori . |
| 4,445,756 | 5/1984 | Komoto . |
| 4,472,031 | 9/1984 | Muryoi . |
| 4,472,032 | 9/1984 | Kamata et al. . |
| 4,726,667 | 2/1988 | Tachihara . |
| 4,799,073 | 1/1989 | Asano et al. . |
| 4,799,964 | 10/1988 | Ozawa et al. . |
| 4,822,153 | 4/1989 | Tomori et al. . |
| 4,911,542 | 3/1990 | Nishio et al. . |
| 4,936,664 | 6/1990 | Haraguchi et al. . |
| 4,944,030 | 7/1990 | Haraguchi et al. . |
| 4,948,227 | 8/1990 | Takeyasu . |
| 5,014,077 | 5/1991 | Yomogizawa et al. . |
| 5,313,329 | 5/1994 | Ueda . |

FOREIGN PATENT DOCUMENTS

| 39-15721 | 8/1939 | Japan . |
| 56-83724 | 11/1954 | Japan . |
| 55-133006 | 10/1980 | Japan . |
| 56-85712 | 7/1981 | Japan . |
| 57-16168 | 4/1982 | Japan . |
| 57-116309 | 7/1982 | Japan . |
| 59-148012 | 8/1984 | Japan . |
| 60-3611 | 1/1985 | Japan . |
| 60-162216 | 8/1985 | Japan . |
| 61-121412 | 7/1986 | Japan . |
| 61-188112 | 11/1986 | Japan . |
| 61-259329 | 11/1986 | Japan . |
| 62-109012 | 5/1987 | Japan . |
| 62-209425 | 9/1987 | Japan . |
| 62-200340 | 9/1987 | Japan . |
| 62-201710 | 12/1987 | Japan . |
| 63-2030 | 1/1988 | Japan . |
| 63-70521 | 5/1988 | Japan . |
| 63-149615 | 6/1988 | Japan . |
| 63-149616 | 6/1988 | Japan . |
| 63-271306 | 11/1988 | Japan . |
| 64-11212 | 1/1989 | Japan . |

*Primary Examiner*—Georgia Yvonne Epps

[57] ABSTRACT

A zoom lens barrel wherein first and second lens groups are moved through different distances along an optical axis in interlocking relation to each other to effect zooming. A device for supporting the second lens group is supported by a device for supporting the first lens group in such a manner that the second lens group supporting device is movable along the optical axis relative to the first lens group supporting device. When a drive ring for driving the first lens group supporting device is activated, the first lens group supporting device is moved forward or rearward along the optical axis in response to the rotation of the drive ring and, at the same time, a drive cam device for driving the second lens group supporting device to move along the optical axis relative to the first lens group supporting device is caused to rotate around the optical axis by the drive ring.